US011910895B2

(12) United States Patent
Martini

(10) Patent No.: US 11,910,895 B2
(45) Date of Patent: Feb. 27, 2024

(54) APPARATUS FOR CARRYING PRODUCTION SOUND MIXING COMPONENTS

(71) Applicant: Kenneth Martini, Sonoma, CA (US)

(72) Inventor: Kenneth Martini, Sonoma, CA (US)

( * ) Notice: Subject to any disclaimer, the term of this patent is extended or adjusted under 35 U.S.C. 154(b) by 489 days.

(21) Appl. No.: 17/313,444

(22) Filed: May 6, 2021

(65) Prior Publication Data

US 2021/0401143 A1 Dec. 30, 2021

Related U.S. Application Data

(63) Continuation-in-part of application No. PCT/US2020/057524, filed on Oct. 27, 2020, which is a continuation-in-part of application No. 16/913,325, filed on Jun. 26, 2020.

(51) Int. Cl.

| | |
|---|---|
| ***A45C 13/02*** | (2006.01) |
| ***A45C 11/00*** | (2006.01) |
| ***H04H 60/05*** | (2008.01) |

(52) U.S. Cl.

CPC .............. *A45C 13/02* (2013.01); *A45C 11/00* (2013.01); *H04H 60/05* (2013.01)

(58) Field of Classification Search

CPC ... A45C 13/02; A45C 11/00; A45C 2013/025; H04H 60/05

See application file for complete search history.

(56) References Cited

U.S. PATENT DOCUMENTS 1,137,579 A * 4/1915 Cohn ..................... A45C 13/02 190/110
4,228,666 A * 10/1980 Perez-Alonso ........ A45C 13/28 70/67
5,161,868 A * 11/1992 Hooser .................. A47B 19/06 312/223.4
5,307,908 A * 5/1994 Shyr ........................ A45C 5/14 190/111
D368,387 S * 4/1996 Bureau .......................... D6/686
(Continued)

FOREIGN PATENT DOCUMENTS

ES 2402627 B1 * 5/2013 ........... A45C 7/0031
WO WO-2019173897 A1 * 9/2019 ............. A45C 13/04

OTHER PUBLICATIONS

8020 LLC : Combo Cabinet (https://www.youtube.com/watch?v=bL1BnTERLMA), (Year: 2014).*
(Continued)

*Primary Examiner* — Don M Anderson
*Assistant Examiner* — Justin Caudill
(74) *Attorney, Agent, or Firm* — Olav M. Underdal; IDP Patent Services

(57) ABSTRACT

An apparatus for carrying sound production components includes a frame with a plurality of vertically interspaced mounting structures, which are vertically adjustable. Each of the vertically interspaced mounting structures releasably engage with a plurality of sound production components. A folding surface with at least one attached wing is pivotably mounted to a top of the frame, such that the folding surface and the at least one attached wing can releasably engage with at least one of the plurality of sound production components. A bag receives the frame in a folded configuration and encloses the frame and the plurality of sound production components.

28 Claims, 17 Drawing Sheets

Apparatus for Carrying Production Sound Mixing Components

(56) References Cited

U.S. PATENT DOCUMENTS

| | | | | | |
|---|---|---|---|---|---|
| 5,762,170 | A * | 6/1998 | Shyr | A45C 5/14 190/114 |
| 5,873,439 | A * | 2/1999 | Liang | A45C 5/14 280/43.1 |
| 5,893,572 | A * | 4/1999 | Parks | B62B 1/26 D34/24 |
| 6,102,172 | A * | 8/2000 | Dercole | A45C 13/262 190/125 |
| 6,595,604 | B1 * | 7/2003 | Peterson | A45C 13/02 190/110 |
| 7,021,436 | B2 * | 4/2006 | Hoberman | A45C 5/14 190/18 R |
| 8,919,508 | B1 * | 12/2014 | Halko | A45C 9/00 280/37 |
| 9,968,861 | B2 * | 5/2018 | Brown, Sr. | A63H 3/003 |
| 10,021,948 | B1 * | 7/2018 | Fell | A45C 13/03 |
| 10,568,400 | B2 * | 2/2020 | Shechter | A45C 5/03 |
| 2001/0017307 | A1 * | 8/2001 | Bentzen | A45F 3/08 224/628 |
| 2001/0032765 | A1 * | 10/2001 | Tiramani | A45C 3/001 190/115 |
| 2005/0099102 | A1 * | 5/2005 | Villarreal | A47B 21/00 312/237 |
| 2005/0121275 | A1 * | 6/2005 | Platte, III | A45C 5/065 190/110 |
| 2006/0096821 | A1 * | 5/2006 | McKaba | A47B 43/003 206/278 |
| 2010/0006614 | A1 * | 1/2010 | McLean | A45C 13/30 70/58 |
| 2010/0089779 | A1 * | 4/2010 | Bowers | G06F 1/1628 206/521 |
| 2015/0097348 | A1 * | 4/2015 | Steinfels | F16M 11/2092 280/47.35 |
| 2015/0136714 | A1 * | 5/2015 | Franklin | H05K 7/18 211/26 |
| 2018/0168308 | A1 * | 6/2018 | Wilkin | A45C 5/14 |
| 2018/0234127 | A1 * | 8/2018 | Lambert | H04B 1/3888 |

OTHER PUBLICATIONS

JulianoSorio13 : Murphy Desk https://www.youtube.com/watch?v=1Tx5DC5G_g8&t=13s (Year: 2020).*

* cited by examiner

Apparatus for Carrying Production Sound Mixing Components

APPARATUS FOR CARRYING PRODUCTION SOUND MIXING COMPONENTS

CROSS-REFERENCE TO RELATED APPLICATIONS

This United States Non-Provisional Application is a Continuation-In-Part of International Application No. PCT/US2020/57524, filed Oct. 27, 2020; which claims the benefit of U.S. Non-Provisional application Ser. No. 16/913,325, filed Jun. 26, 2020; both of which are hereby incorporated herein by reference in their entirety.

FIELD OF THE INVENTION

The embodiments generally relate to bags and electronic transport assemblies and, more specifically, relate to modular bags for carrying audio mixing components.

BACKGROUND OF THE INVENTION

A production sound mixer is a member of a film production crew or television crew responsible for recording sound on set during the filmmaking or television production process using professional audio equipment. Equipment used may include various audio mixers and recorders, batteries, wireless radios, booms, audio storage components, headphones, cables, tools, sound logs, and power distribution systems. The specific equipment and amount thereof varies based on the production size and type.

The sound mixing professional often arrives with their equipment to capture a wide variety of sounds while considering the format of the finished product. Components are carried in a bag which holds each element and allows the sound mixing professional to move during the recording process.

In the current arts, bags are designed for specific equipment sizes and dimensions and only allow the user to carry the components in a single configuration. Using the carrying bag on a desktop, table, or other surface can be inconvenient for the sound mixing professional as the arrangement of the audio components is restricted to a single configuration. Further, it may be difficult to address technical problems, as current bags are unable to manage a large number of wires inherent in the production process.

As such, considering the foregoing, it may be appreciated that there continues to be a need for novel and improved devices and methods for modular bags for carrying audio mixing components.

SUMMARY OF THE INVENTION

The foregoing needs are met, to a great extent, by the present invention, wherein in aspects of this invention, enhancements are provided to the existing model of modular bags for carrying audio mixing components.

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

Embodiments described herein provide an apparatus for carrying sound production components, comprising a rigid frame including vertically interspaced first, second, and third surfaces. Each of the first surface, second surface, and third surface releasably engage with a plurality of sound production components. A first wing and a second wing are pivotably mounted to the third surface to releasably engage with at least one of the plurality of sound production components. A bag receives the rigid frame in a folded configuration and encloses the rigid frame and the plurality of sound production components.

The embodiments provide a means for carrying sound production components as well as arranging the frame on a surface such as a desktop, table, etc. The apparatus may be carried both within the bag or using the frame to permit use in various settings.

In one aspect, a handle is releasably engaged with the rigid frame via one or more handle brackets.

In one aspect, the handle is pivotably engaged with the handle brackets.

In one aspect, the bag permits the handle to extend to the exterior of the bag.

In one aspect, the first and the second wings are arrangeable in a folded and an unfolded configuration.

In one aspect, the plurality of sound production components comprise at least one of the following: at least one power distribution system, at least one recorder, at least one audio mixer, at least one audio recorder, at least one battery, at least one wireless radio, at least one audio storage component, and a plurality of cables.

In one aspect, a computing device mount permits the mounting of a computing device.

In one aspect, a support is pivotably engaged with the first surface. The support arranges the frame in a suitable position when positioned on a surface There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
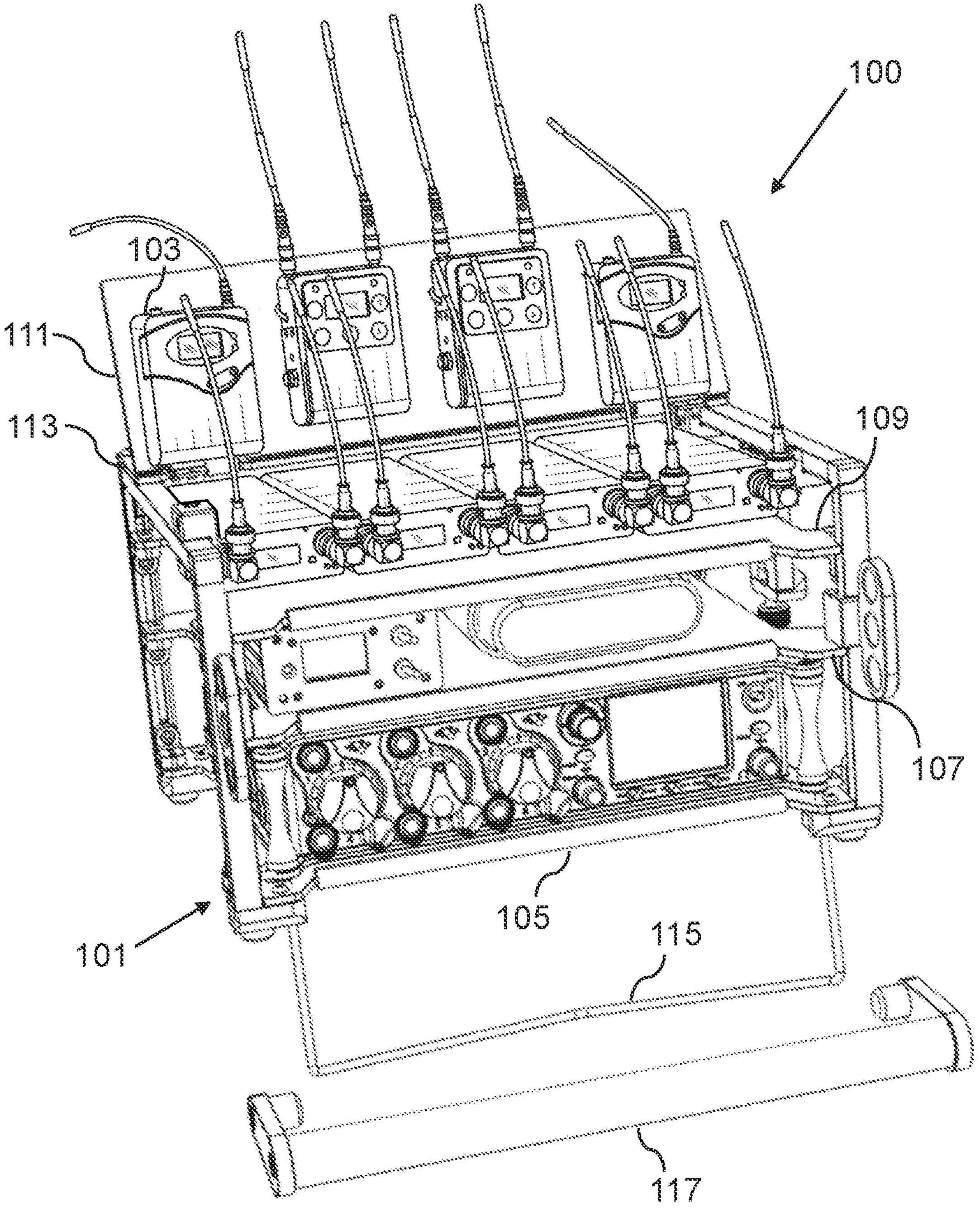
FIG. 1 illustrates a perspective view of the frame of the carrying apparatus and sound production components mounted thereto, wherein the frame is in a folded configuration, according to some embodiments.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as “first” and “second,” “top” and “bottom,” and the like, may be used solely to distinguish one entity or element from another entity or element without necessarily requiring or implying any physical or logical relationship, or order between such entities or elements.

In general, the embodiments provided herein relate to an apparatus for carrying production sound mixing components. The equipment used may include various audio mixers and recorders, batteries, wireless radios, booms, audio storage components, headphones, cables, tools, sound logs, and power distribution systems. Each equipment item may be releasably engaged with a frame, which may be arranged in a folded or unfolded configuration. The frame may be positioned within a bag during use or may be removed from the bag to allow the frame to be positioned on a surface such as a desktop, table, etc.

As used herein, the term “sound production components” relates to any electronic or nonelectronic component utilized by a sound mixing professional during the filming and production processes. For example, sound production components may include audio mixers and recorders, batteries, wireless radios, booms, audio storage components, headphones, cables, tools, sound logs, and power distribution systems. One skilled in the arts will readily understand that the embodiments may be used to transport and operate sound production components not specifically mentioned in the instant disclosure.

The sound product components may be held in place on one or more surfaces using various attachment or securing means known in the arts. For example, hook-and-loop systems may be used to releasably the sound production components with the surfaces or portion thereof. In another example, rubber bumpers may be provided on the surface to secure the sound production component by compressive force.

FIG. 1 illustrates a perspective view of an apparatus 100 having a frame 101 with sound production components 103 mounted thereto. The frame 101 is comprised of a first surface 105, second surface 107, and third surface 109 arranged as a first tier, second tier, and third tier respectively. Each surface permits the utilization, support, and releasable engagement of various sound mixing components utilized by the sound mixing professional during the filming and production processes. A folding surface 111 is pivotably mounted to a top 113 of the apparatus 100. The folding surface 111 provides a mounting surface for one or more of the sound production components 103. A support 115 is pivotably mounted to the bottom side of the first surface 105 to support the frame 101 when positioned on a surface. The support 115 adjusts the angle of the frame when rested on a surface to provide easy access, manipulation, operation, and interpretation of the sound mixing components 103 during use. A handle 117 is shown removed from the frame 101. The handle 117 may be selectively attached during use.

In some embodiments, additional surfaces can be added to the frame 101.

In some embodiments, each tier facilitates the organization of sound mixing components. Tier heights may be adjusted based on the size and number of sound mixing components used. The first, second and third surfaces provide attachments for the sound mixing components to be mounted thereto while providing protection from shock, impact, and the like.

Figure 2A:
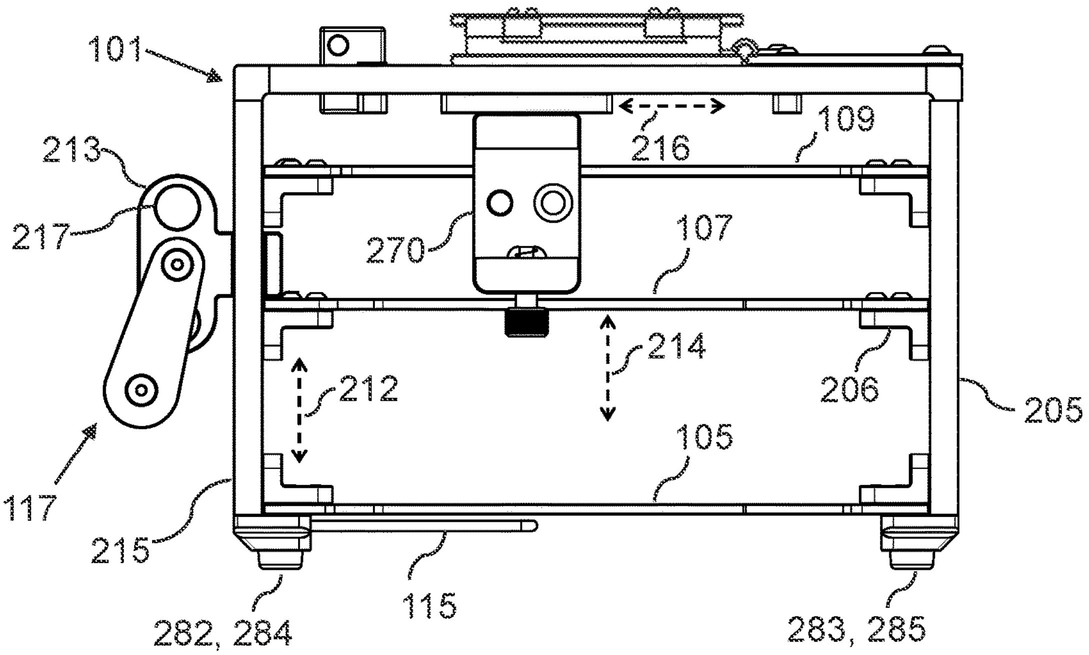
FIG. 2A illustrates a side elevation view of the apparatus frame, according to some embodiments.

FIG. 2A illustrates a side elevation view of the frame 101. Vertical rails 205 support the first, second, and third surfaces 105, 107, 109 to provide vertical space wherein the sound mixing components are disposed. A handle bracket 213 is mounted to a first side 215 of the frame 101 to pivotably engage the handle 117. The handle 117 is received by at least one aperture 217 provided on the handle bracket 213.

Figure 2B:
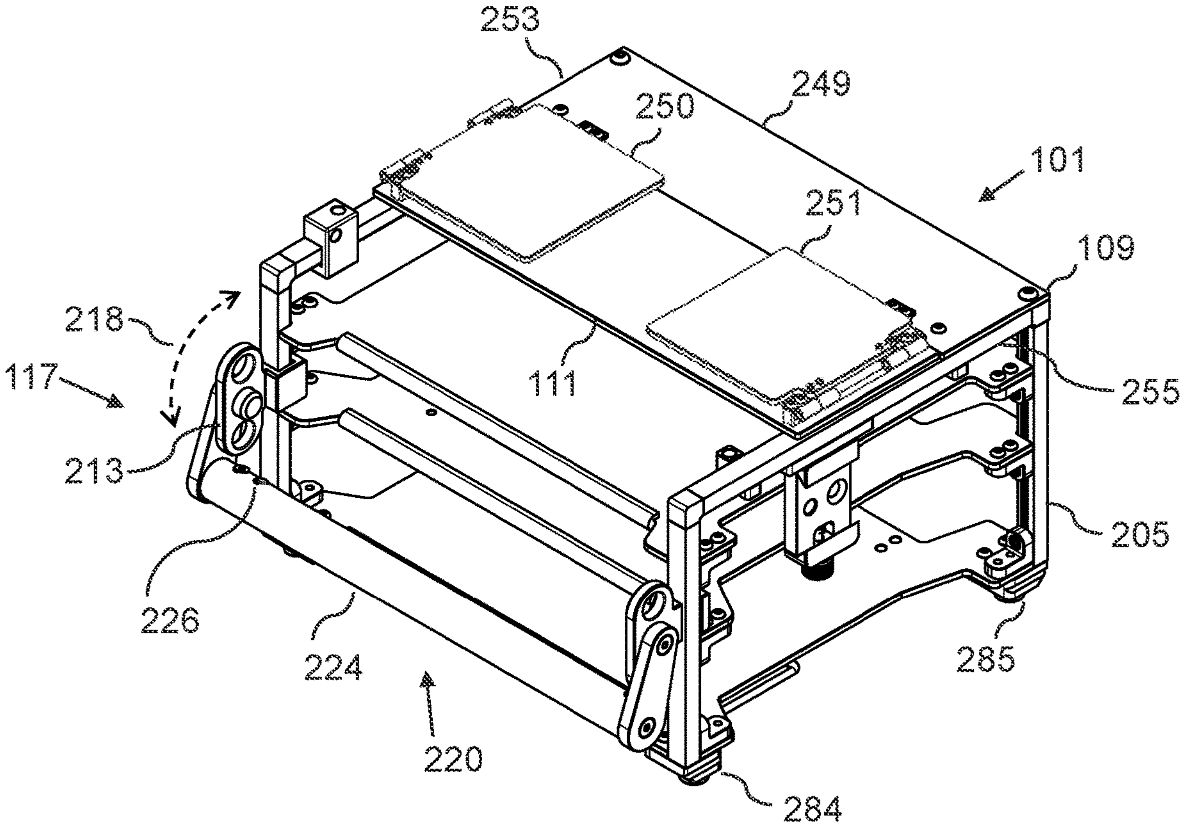
FIG. 2B illustrates a perspective view of the frame of the carrying apparatus, according to some embodiments.

FIG. 2B illustrates a perspective view of the frame 101 of the apparatus. At least one wing, which can be a first wing 250 and a second wing 251, can be pivotably mounted to the folding surface 111 to allow the user to selectively fold or unfold each wing 250, 251. The first wing 250 unfolds to extend laterally over a first edge 253 of the folding surface 111 while the second wing 251 unfolds to extend laterally over a second edge 255 of the folding surface 111.

In some embodiments, each wing 250, 251 may be raised from the folding surface 111 to permit the attachment of at least one sound mixing component while in a folded configuration as illustrated in FIG. 2B.

Figure 2C:
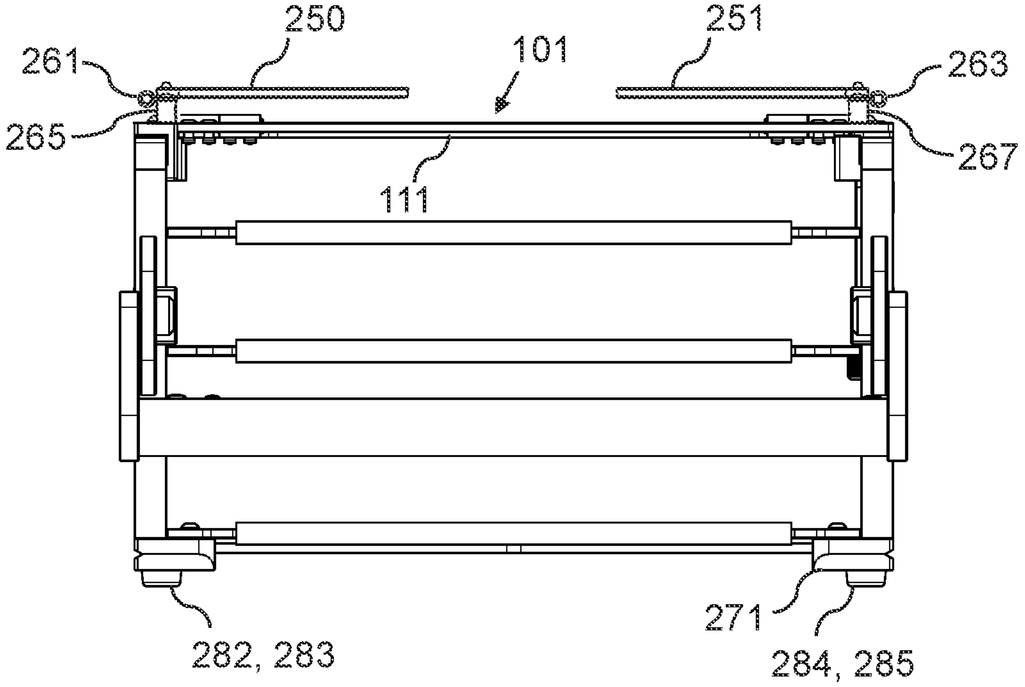
FIG. 2C illustrates a front elevation view of the frame and shelving, according to some embodiments.
Figure 2D:
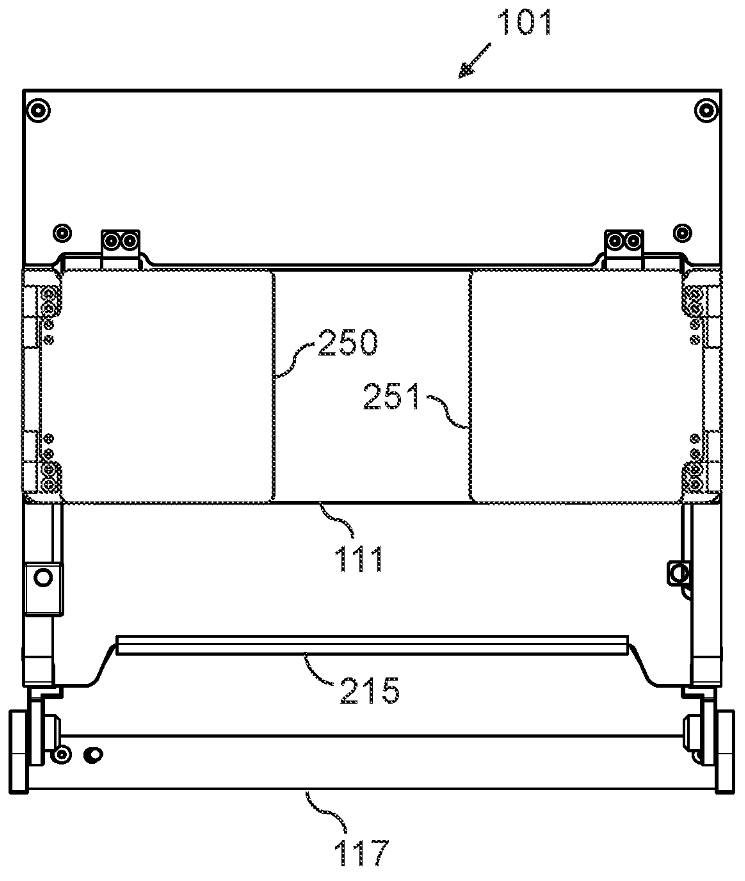
FIG. 2D illustrates a top plan view of the frame, according to some embodiments.

FIG. 2C illustrates a front elevation view of the frame 101 and shelving (first, second, and third surfaces). Each wing 250,251 includes a pivot 261,263 to allow the wings to pivot. Members 265,267 vertically raise the wings 250,251 to permit the attachment of a sound production component when in a folded configuration. Leg structures 282, 283, 284, 285 are provided on each corner of the bottom side 271 of the frame to retain the frame 101 on a desktop or similar surface. FIG. 2D illustrates a top plan view of the frame 101 showing the top of the folding surface 111 and wings 250,251. The handle 117 is mounted to the first side 215 to allow the user to carry the apparatus 100 during use.

In some embodiments, members 265, 267 can be configured as torque hinges. Torque hinges, or friction hinges, provide resistance to the pivoting motion of the hinge itself, making these products suitable for holding lids, doors, panels, or display devices at specific angles for extended periods of time. These hinges have been widely adopted in the electronics sector and in a variety of commercial and industrial settings for their practicality and durability.

Figure 3:
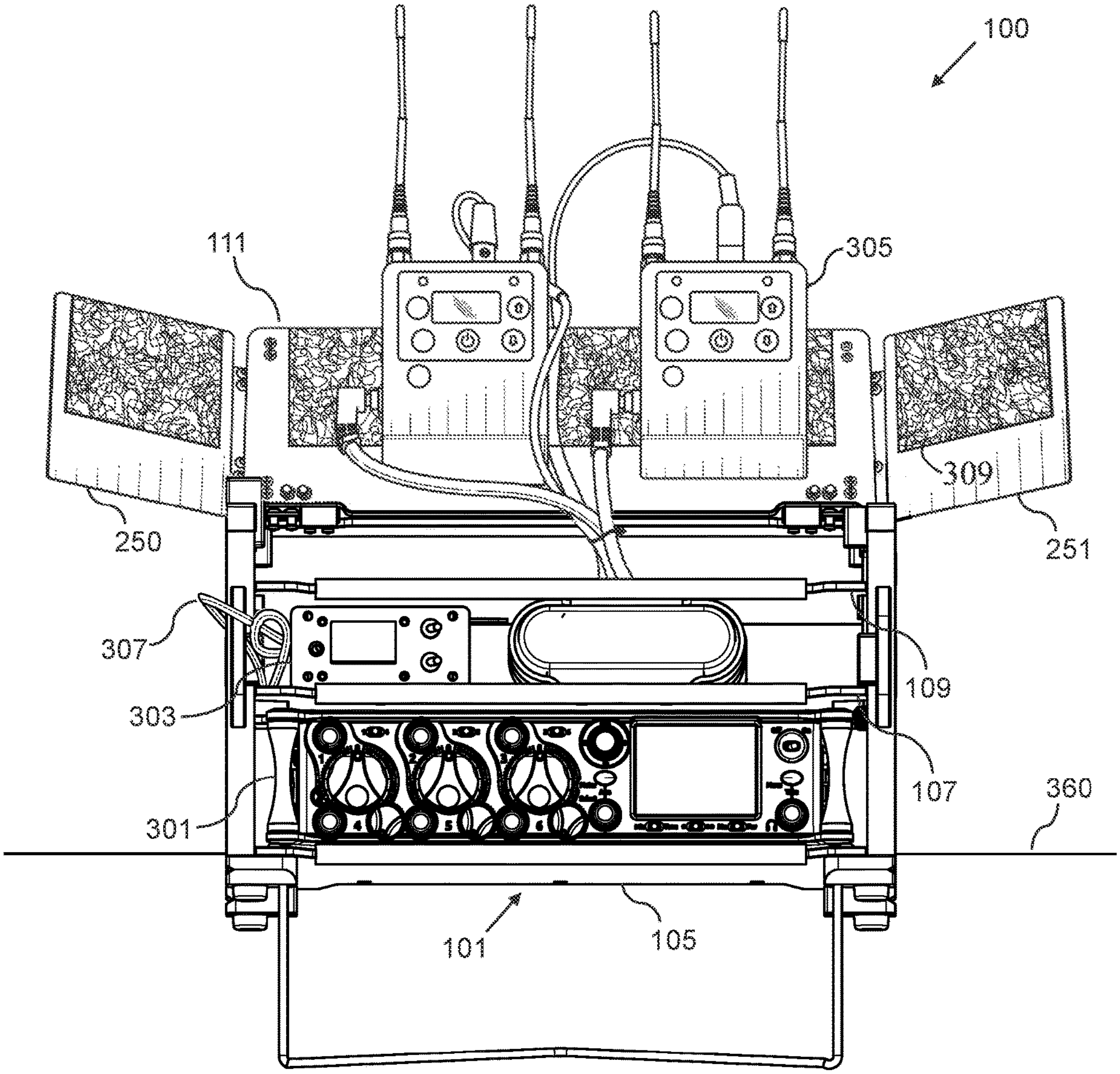
FIG. 3 illustrates a perspective view of the frame of the carrying apparatus and sound production components thereof wherein the frame is arranged in an unfolded configuration, according to some embodiments.

FIG. 3 illustrates a perspective view of the frame 101 of the apparatus 100 and sound production components thereof wherein the frame 101 is arranged in an unfolded configuration such that the wings 250,251 are extended laterally from the central portion of the frame 101. In an exemplary embodiment, the first surface 105 permits the engagement of a mixer and recorder 301. The second surface 107 permits mounting of a power distribution system 303 with a battery power to distribute power to the various sound production components. The folding surface 111 permits mounting of wireless radios 305 or similar communications systems. The apparatus 100 easily organizes and allows for the management of wires 307 in electrical communication with the various sound production components. In one example, the sound mixing components may be mounted using a hook-and-loop system (general mounting components 309) to easily attach and remove the various sound mixing components provided in the frame 101.

FIGS. 4A, 4B, 4C, and 4D illustrate various views of the frame 101. The support 115 is pivotably 116 engaged with receivers 401, 403 mounted on a bottom of the frame 101, to allow the user to selectively fold and unfold the support during use or during storage. Specifically, FIGS. 4A-4D illustrate the support 115 in an unfolded configuration to facilitate the manipulation and operation of sound production components during use.

Figure 5:
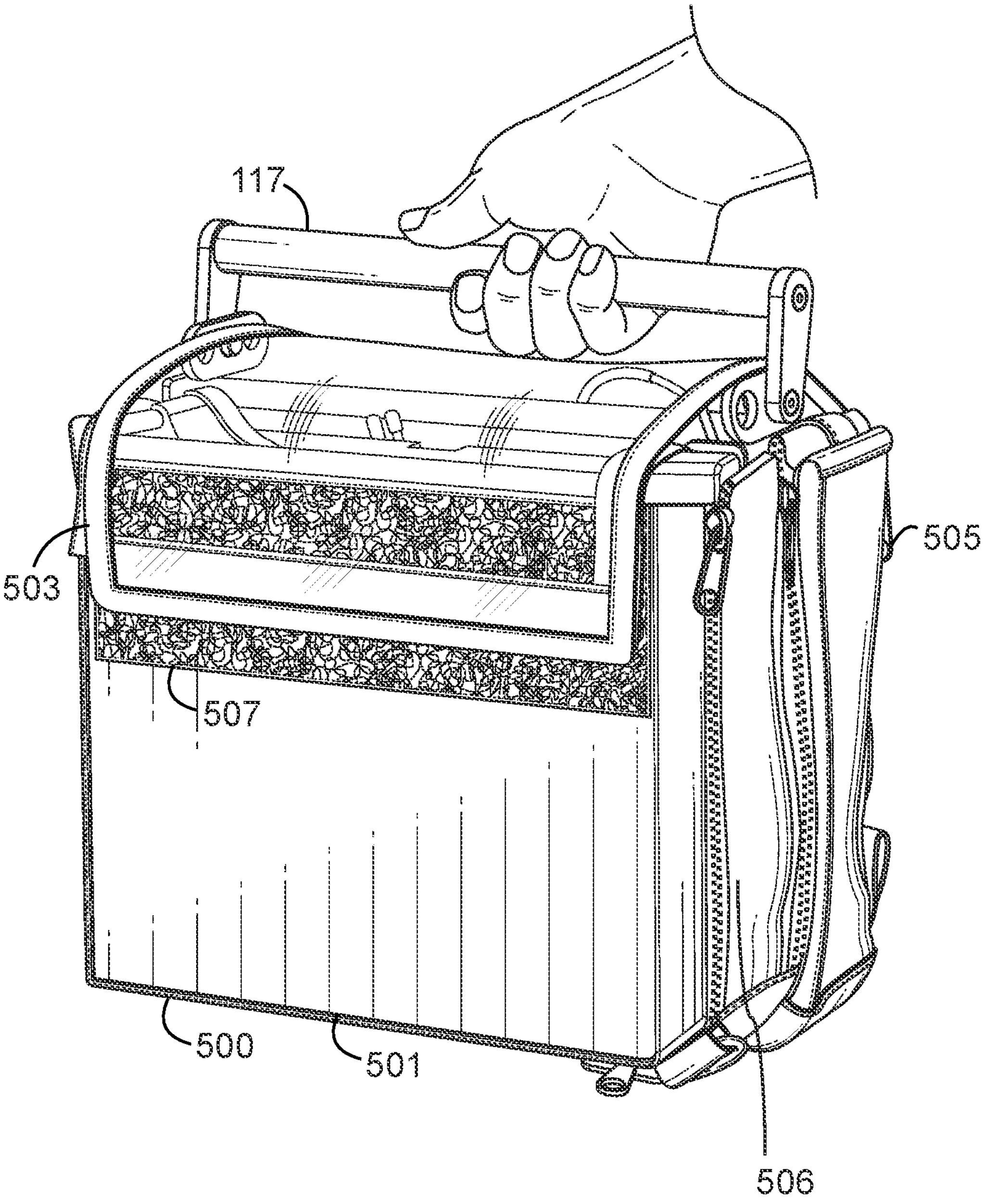
FIG. 5 illustrates a perspective view of the bag and handle for enclosing and carrying the sound production components, according to some embodiments.
Figure 6:
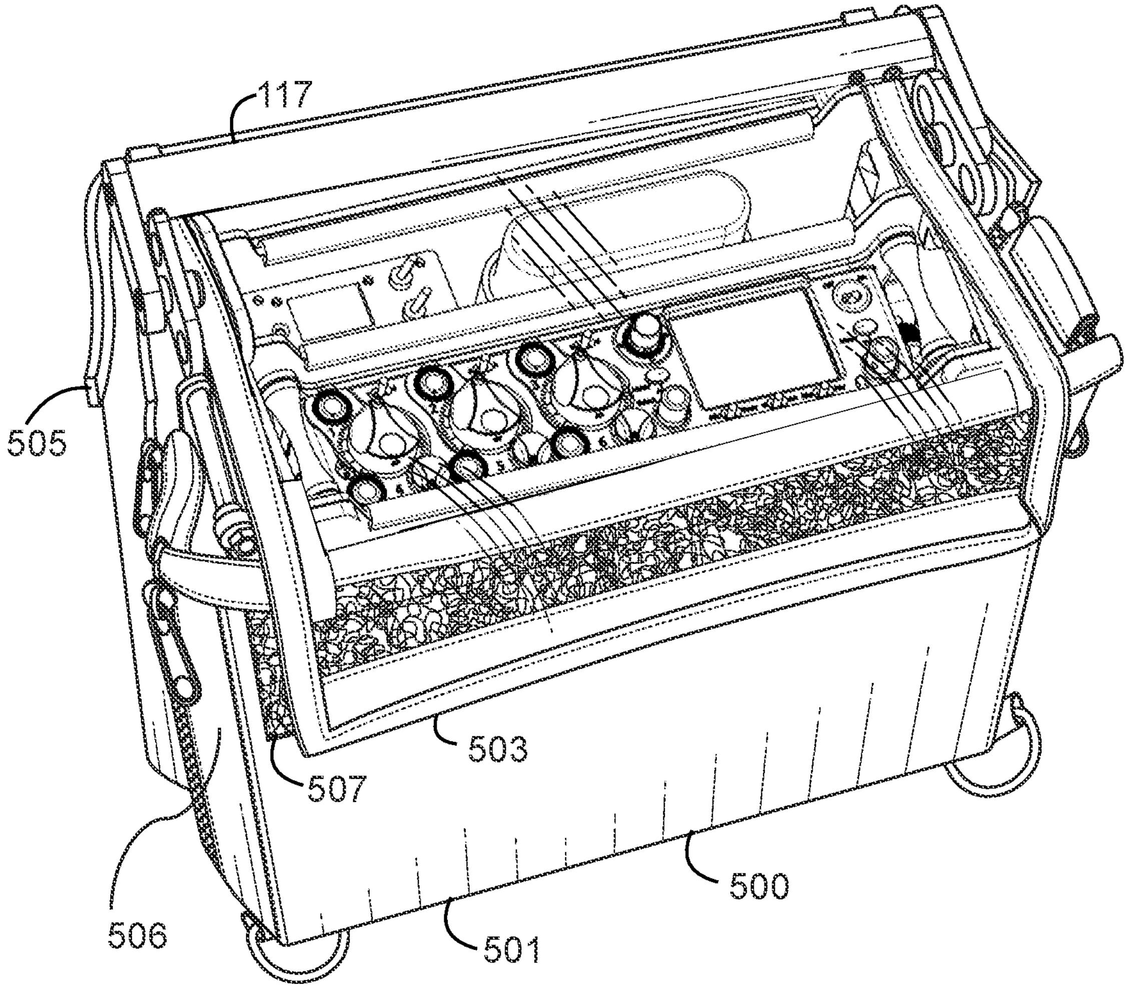
FIG. 6 illustrates a perspective view of the bag for enclosing and carrying the sound production components, according to some embodiments.

FIG. 5 and FIG. 6 illustrate perspective views of the bag 500 and handle 117. The bag 500 forms an enclosure around the frame and sound production components during transportation and during use. In such, the user may operate and perform various sound production tasks with the frame disposed within the enclosure of the bag 500 or may remove the frame from the bag 500. The bag 500 permits the handle 117 to extend to an exterior of the enclosure to permit the utilization of the handle while the bag is closed around the frame. The cover 503 extends from the back side 505 to the front side 507 of the bag 500. The cover 503 may be constructed at least partially of a transparent or semi-transparent material to allow the user to view the displays and/or controls of the sound production components within the bag 500. The cover 503 may be releasably engaged via a hook-and-loop system, snap-fit mechanisms, or similar mechanism for releasably engaging textiles. The bag 500 provides a barrier between the exterior environment to protect the sound production components from impact, hazardous materials and debris, moisture, tampering, and the like.

In some embodiments, the bag 500 may comprise a plurality of compartments 506 on the exterior of the bag wherein the user may dispose various items.

In some embodiments, the bag 500 can be configured to adjust height-wise, such that the bag 500 can accommodate increases in height of the frame 101.

Figure 7:
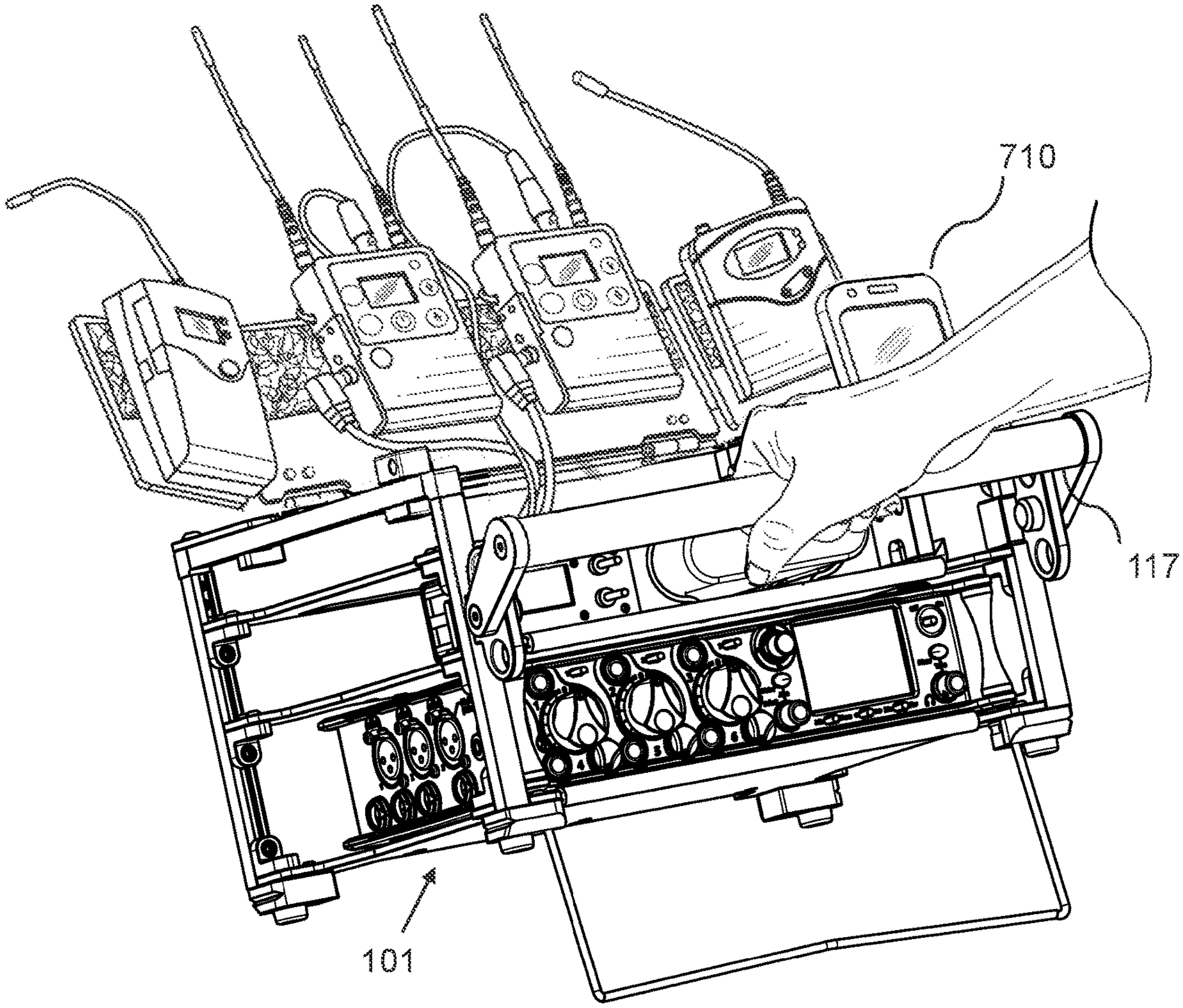
FIG. 7 illustrates a perspective view of the frame and sound production components, wherein the frame is in an unfolded configuration having the handle attached thereto, according to some embodiments.

FIG. 7 illustrates a perspective view of the frame 101 and sound production components 103, wherein the frame 101 is in an unfolded configuration having the handle 117 attached thereto. A computing device 710 such as a mobile phone or similar personal electronic device may be attached to the frame 101, via a mount for convenience, or to communicate with the various sound production components.

Figure 8:
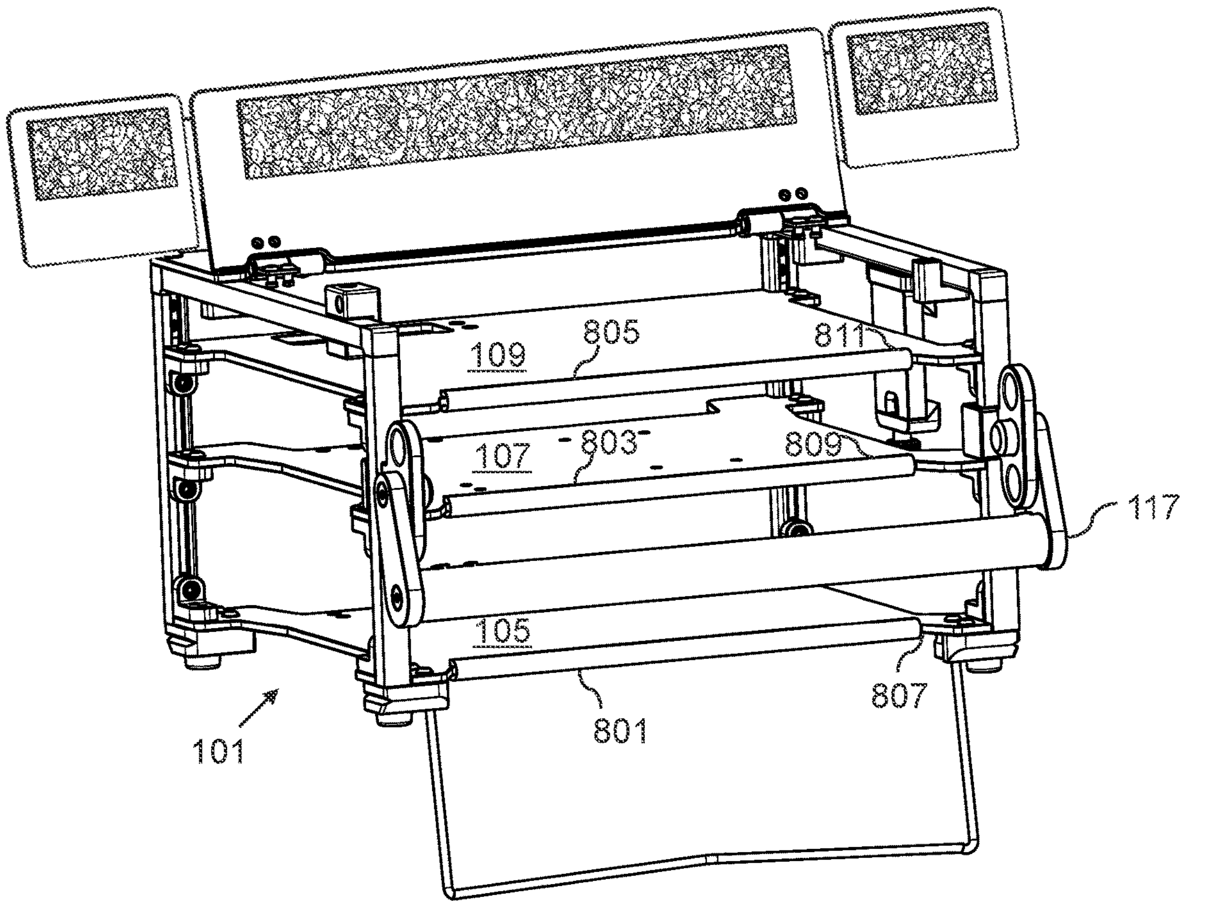
FIG. 8 illustrates a perspective view of the frame in an unfolded configuration having the handle attached thereto, according to some embodiments.

FIG. 8 illustrates a perspective view of the frame 101 in an unfolded configuration having the handle 117 attached thereto without the sound production components. Edge surfaces 801,803,805 are provided on front edges 807,809, 811 are provided to form a smooth surface and provide protection against damage to the frame 101. The edge surfaces 801,803,805 provide rigidity to the surfaces of the frame. The embodiments allow for modulation of the sizes, dimensions, and configuration of the apparatus to accept various sizes and numbers of sound mixing components.

In some embodiments, the materials of the frame are sufficiently rigid to prevent bending or undue stress during use of the apparatus. Metals, metal alloys and similar materials may be used to provide sufficient rigidity. Further, lightweight rigid materials including carbon fiber and the like may be implemented to reduce weight of the frame making the apparatus suitable for long-term use. Edges of the materials may be finished to round edges and reduce the risk of injury, abrasion, and the propensity for unfinished materials to catch and snag textiles.

Figure 9:
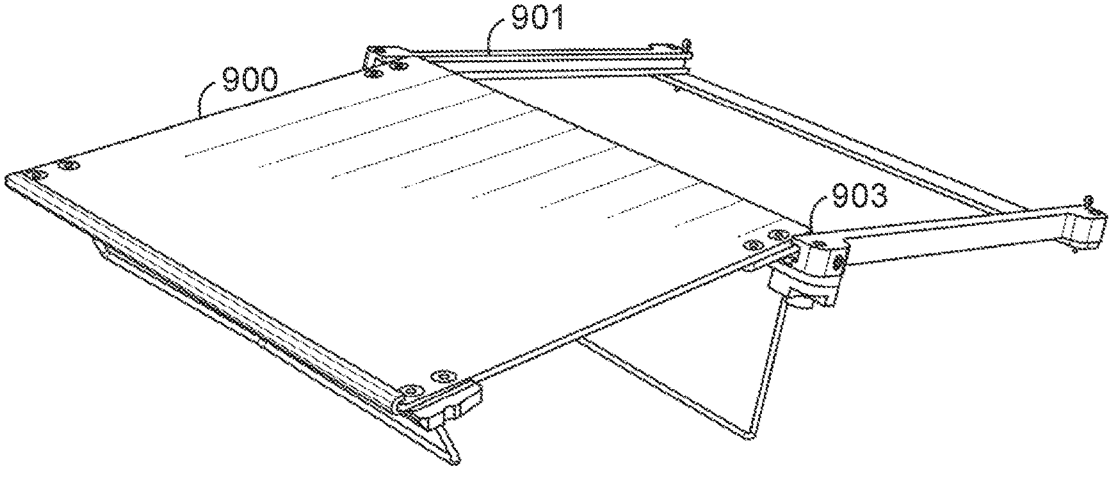
FIG. 9 illustrates a perspective view of the tray, according to some embodiments.

FIG. 9 illustrates a perspective view of the tray 900 providing a sliding surface for the various audio components. The tray 900 comprises a mounting portion 901 which may articulate via a pivot 903 provided on each side of the tray 900. The tray 900 provides the user the option to utilize at least one additional surface, thus forming a fourth surface for the releasable attachment of a plurality of audio equipment. One skilled in the arts will readily understand that the tray 900 may be configured to form any surface of the frame. Similarly, the frame is not limited to a number of surfaces and may be provided with additional surfaces as needed.

Figure 10:
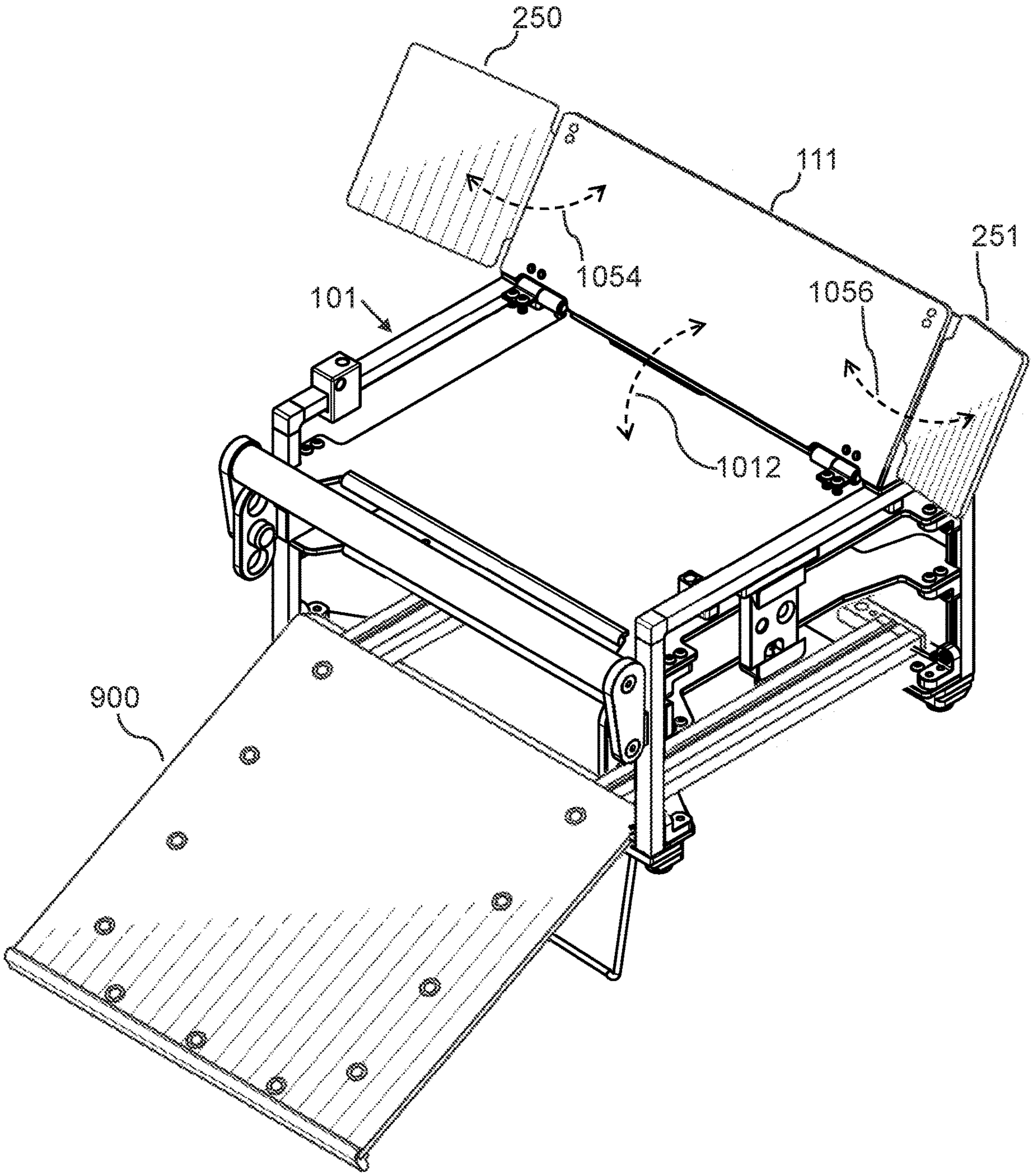
FIG. 10 illustrates a perspective view of the tray engaged with the frame, according to some embodiments.

FIG. 10 illustrates the tray 900 in an expanded configuration slidingly attached to the frame 101. The tray 900 may be slid into the frame 101 in a contracted configuration wherein the tray 900 forms a surface of the frame 101. In such, the tray 900 may retain one or more sound production components thereon while allowing the tray 900 to slide out of the frame to present the sound production component during use.

In an embodiment, an apparatus 100 for carrying sound production components 103, can include:

a rigid frame 101 including a plurality of vertically interspaced surfaces 105, 107, 109, such as for example 2, 3, 4, or more vertically interspaced surfaces 105, 107, 109, such that each of the vertically interspaced surfaces 105, 107, 109 is configured to releasably engage with a plurality of sound production components 103. The rigid frame can alternatively be described as including a frame body 101, and a plurality of vertically interspaced surfaces 105, 107, 109, which are each connected to the frame body 101;

at least one wing 250, 251, which can be a first wing 250 and a second wing 251, which is pivotably mounted to a top side 249 of the uppermost surface 113, such that the at least one wing 250, 251 is configured to releasably engage with at least one of the plurality of sound production components 103; and a bag 500, which is configured to receive the rigid frame 101 in a folded configuration and enclose the rigid frame 101 and the plurality of sound production components 103.

In a related embodiment, the apparatus 100 for carrying sound production components 103, can further include:

a support 115, which is pivotably mounted to a bottom side of a lowermost surface 105 in the plurality of vertically interspaced surfaces 105, 107, 109, wherein the support 115 is configured to arrange the rigid frame 101 in a selected position, which can be a suitable and preferred position for use of the apparatus 100 to access the plurality of sound production components 103, wherein the support 115 is configurable in an in-use configuration and a storage configuration.

In a related embodiment, the first, second, and third surfaces 105, 107, 109 are slidably attached to vertical rails 205, such that the first, second, and third surfaces 105, 107, 109 are vertically adjustable;

wherein each surface 105, 107, 109 can be slidably attached to vertical rails 205 using a slidable assembly 206, as shown in FIG. 2A.

Figure 11A:
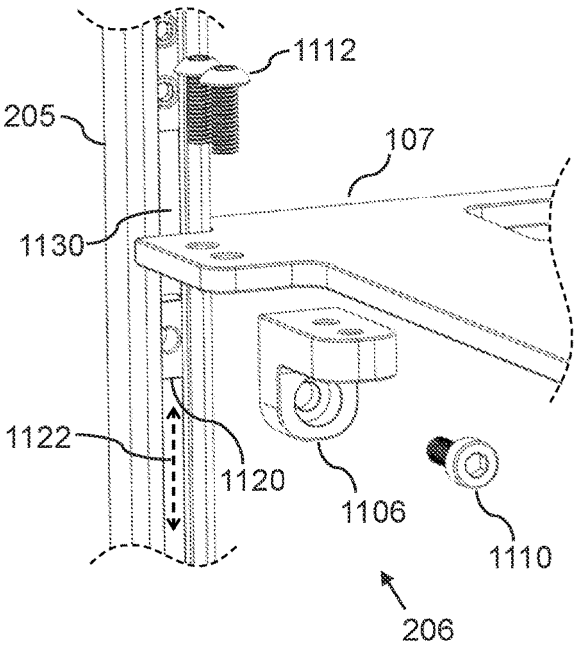
FIG. 11A illustrates a perspective section view of an exploded slidable assembly, according to some embodiments.
Figure 11B:
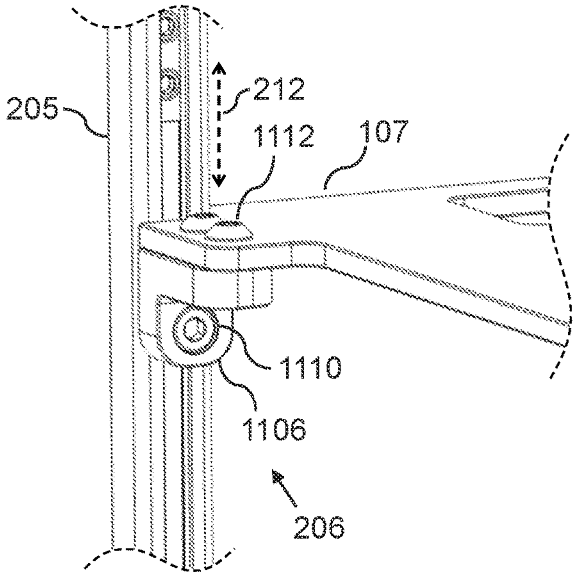
FIG. 11B illustrates a perspective section view of the slidable assembly, according to some embodiments.
Figure 11C:
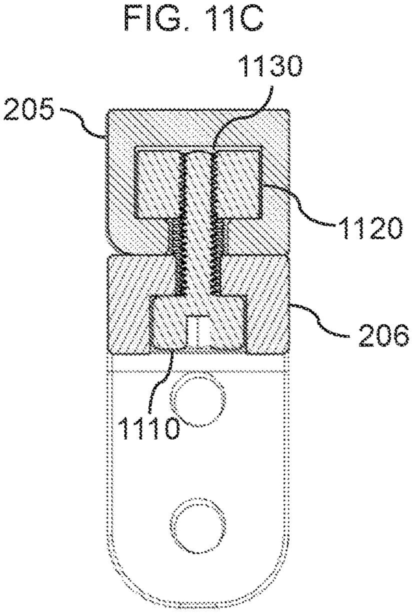
FIG. 11C illustrates a top section cut view of the slidable assembly, according to some embodiments.

FIGS. 11A-11C illustrate a slidable assembly 206, which can include:

a) a connection bracket 1106, which can be attached to the first, second, or third surface 105, 107, 109 with at least one surface screw 1112, such that the connection bracket 1106 is slidably connected to a vertical column;

b) a slidable member 1120, which can be slidably inserted into a hollow elongated interior 1130 of the vertical column 205, which can configured as a vertical rail 205, which comprises an elongated interior 1130; and c) a screw 1110, which can be inserted through the connection bracket 1106 and screwed into the slidable member 1120;

such that the screw 1110 can be tightened to securely hold the slidable assembly 206 against the vertical rail 205 and secure the surface 105, 107, 109 at a vertical height, and the screw 1110 can be loosened to permit the slidable assembly 206 to slide against the vertical rail 205 and slidably adjust the surface 105, 107, 109 to a new vertical height.

Figure 12A:
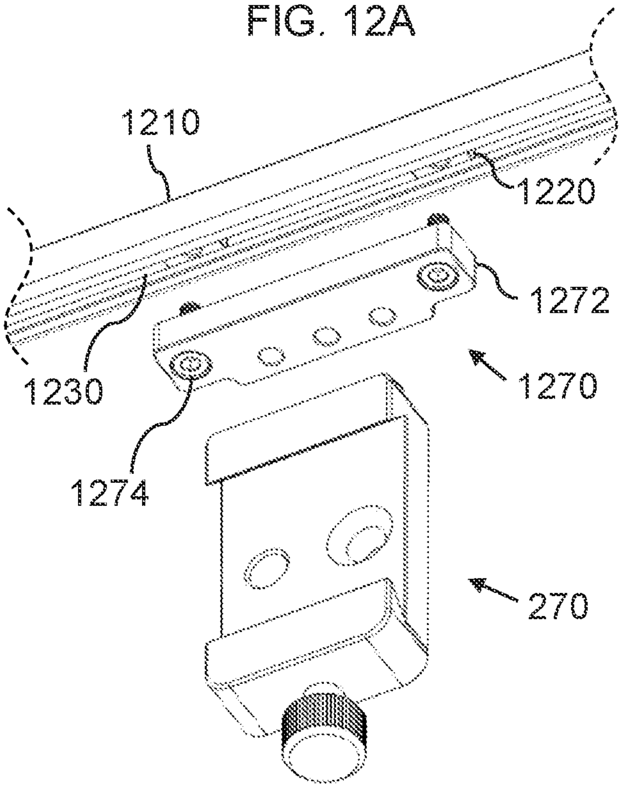
FIG. 12A illustrates a perspective section view of an exploded computing device mount, according to some embodiments.
Figure 12B:
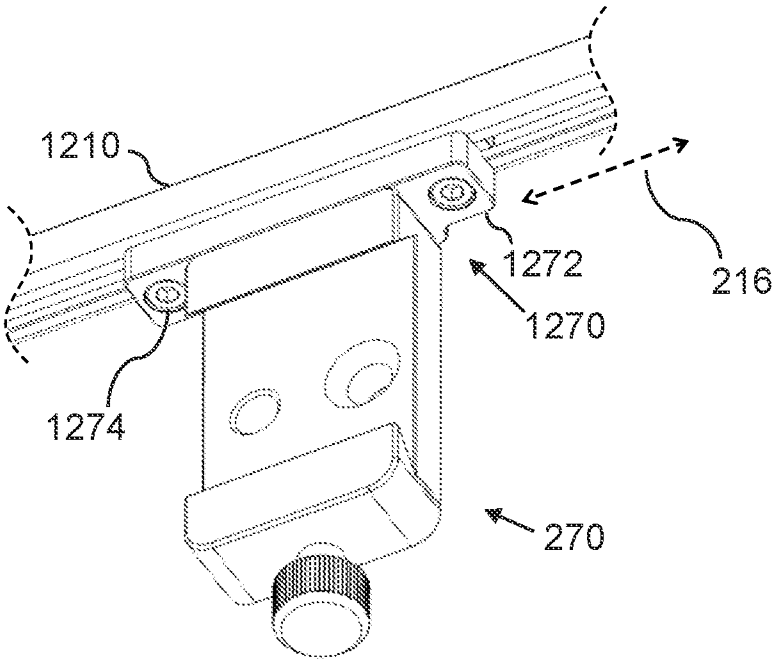
FIG. 12B illustrates a perspective section view of computing device mount, according to some embodiments.

FIGS. 2A and 12A-12B illustrate a computing device mount 270. The computing device mount 270 permits the mounting of a computing device 710 and other accessories to the apparatus 100. The computing device mount 270 is slidably attachable to a horizontal rail 1210 through the use of a sliding attachment mount 1272. The sliding attachment mount 1272 is slidably attached to slidable members 1120 inside the horizontal rail 1210, such that the computing device 710 can be slidably adjusted along the horizontal rail 1210.

Thus, in an embodiment, as shown in FIGS. 1 and 5, an apparatus 100 for carrying sound production components can include:

a) a frame 101;

b) a plurality of mounting structures 105, 107, 109, which are connected to the frame 101, such that the mounting structures 105, 107, 109 are vertically interspaced, such that each mounting structure of the mounting structures 105, 107, 109 is configured to releasably engage with a plurality of sound production components 103; and c) a bag 500, which is configured to receive the frame 101 in a folded configuration and enclose the frame 101 with the plurality of mounting structures 105, 107, 109 and the plurality of sound production components 103.

In a related embodiment, the frame 101 can be rigid.

In a related embodiment, as shown in FIGS. 1 and 3, the apparatus 100 can further include:

a folding surface 111, which can be pivotably mounted to a top 113 of the frame 101, such that the folding surface 111 can be configured to be upwards rotatable 1012, such that at least one first sound production component 103 of the plurality of sound production components 103 can be attachable to the folding surface 111 when the folding surface 111 is rotated upwards;

such that the folding surface 111 can be configured to be arrangeable in a folded and an unfolded configuration, as shown in respectively FIGS. 2A-2B and FIG. 3.

In a further related embodiment, as shown in FIGS. 2B, 2C, and 3, the apparatus 100 can include:

a) at least one wing 250, 251, which can be pivotably mounted to a first side (i.e. for example a right or left side) of the folding surface 111, such that the at least one wing 250, 251 can be configured to be outwards pivotable 1054, 1056 when the folding surface 111 is rotated upwards;

such that the at least one wing 250, 251 can be configured to be arrangeable in a folded and an unfolded configuration, as shown in respectively FIGS. 2A-2B and FIG. 3.

such that at least one second sound production component 103 of the plurality of sound production components 103 can be attachable to the at least one wing 250, 251 when the at least one wing 250, 251 is rotated outwards in the unfolded configuration.

In another related embodiment, each mounting structure 105, 107, 109 in the plurality of mounting structures 105, 107, 109 can further include:

a mounting surface.

In a further related embodiment, as shown in FIGS. 5 and 6, the bag 500 can further include a bag body 501 and a cover 503 to enclose the frame 101 and the plurality of sound production components 103 within the bag body 501.

In a yet further related embodiment, as shown in FIGS. Sand 6, the cover 503 can be at least partially constructed of a transparent material to permit a user to view the plurality of sound production components 103 within the bag 500.

In another further related embodiment, as shown in FIG. 5, the bag 500 can further include a plurality of compartments 506 positioned on an exterior of the bag body 501.

In another related embodiment, as shown in FIG. 2A, the apparatus 100 can further include:

a) a handle 117; and b) at least one handle bracket 213, which can be connected to the frame;

wherein the handle 117 can be releasably engaged with the rigid frame 101 via the at least one handle bracket 213.

In another further related embodiment, the handle 117 can pivotably 218 engage with the at least one handle bracket 213, wherein the at least one handle bracket 213 can include at least one aperture 217 which can be configured to pivotably receive the handle 117.

Figure 4A:
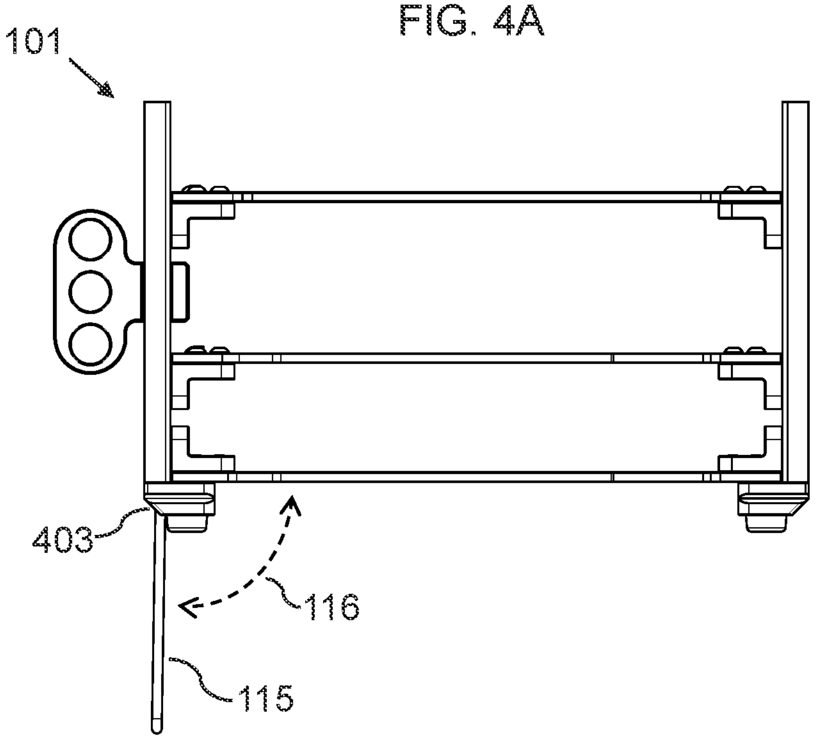
FIG. 4A illustrates a side elevation view of the support and frame, according to some embodiments
Figure 4B:
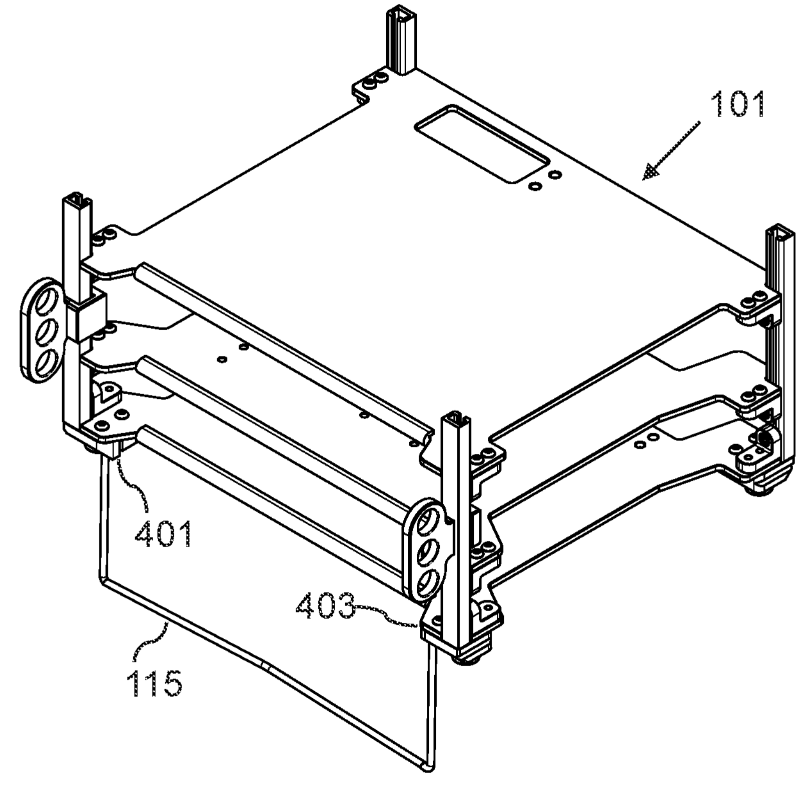
FIG. 4B illustrates a perspective view of the support and frame, according to some embodiments.
Figure 4C:
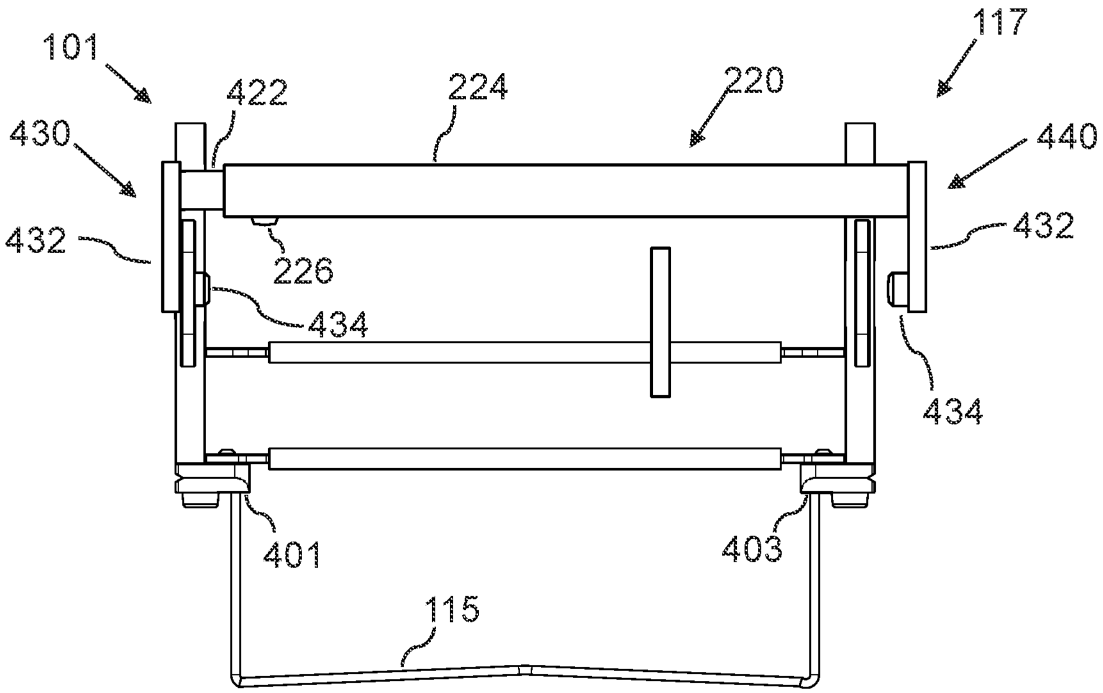
FIG. 4C illustrates a front elevation view of the support and frame, according to some embodiments.
Figure 4D:
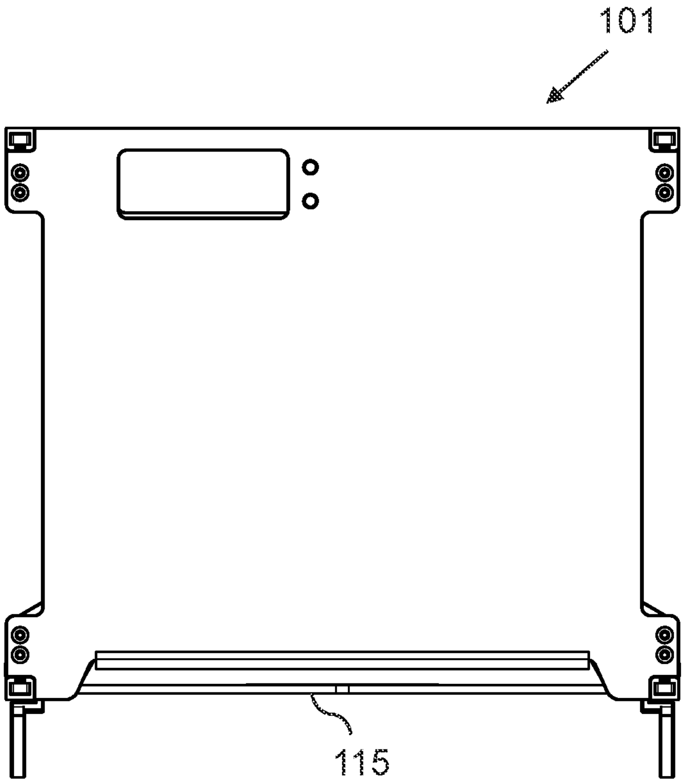
FIG. 4D illustrates a top plan view of the frame, according to some embodiments.

In another further related embodiment, as shown in FIGS. 2B and 4C, the handle 117 can further include:

a) a telescoping portion 220, which can include:

i. a first elongated member 422;

ii. a second elongated member 224; and iii. a releasable lock 226;

wherein the telescoping portion 220 is configured to be extendable, such that the first elongated member 422 slides into (or alternatively onto) the second elongated member 224;

such that when the releasable lock 226 is released, the telescoping portion 220 can be extended, to allow removal of the handle 117, as shown in FIG. 4C;

such that when the telescoping portion 220 is shortened, the releasable lock 226 can be locked when the handle 117 is positioned in place on the handle brackets 213, such that the releasable lock 226 is configured to lock the handle 117 in place on the at least one handle bracket, as shown in FIG. 2B;

b) first and second I-shaped members 430, 440, which each can include i. an arm 432, protruding from a first or second end of the telescoping portion 220, respectively; and ii. and inward protruding member 434, such that a first end of the inward protruding member 434 is connected to an inner side of an outer portion of the arm 432, wherein a second end of the inward protruding member 434 is configured to be inserted into (and protrude through) an aperture 217 of a first or second mounting bracket 213, respectively.

In another related embodiment, as shown in FIG. 5, the bag 500 can be configured to permit the handle 117 to extend to an exterior of the bag 500, when the frame 101 is positioned in the bag 500.

In a related embodiment, as shown in FIG. 3, the plurality of sound production components 103 can include at least one of the following: at least one power distribution system 303, at least one recorder and at least one audio mixer 301, at least one audio recorder, at least one battery, at least one wireless radio 305, at least one audio storage component, and a plurality of cables 307.

In a related embodiment, as shown in FIGS. 3, 4A, and 4B, the apparatus 100 can further include:

a) a support 115, which can be pivotably 116 connected to a bottom of the frame 101, wherein the support 115 can be configured to arrange the frame 101 in a selected position when positioned on a flat surface 360, wherein the support can be configurable in an in-use configuration and a storage configuration.

In a further related embodiment, as shown in FIG. 3, the selected position can be an upward angled position of the frame 101 when positioned on the flat surface 360.

In a related embodiment, each corresponding mounting structure 105, 107, 109 in the plurality of mounting structures 105, 107, 109 can be vertically slidably 212 attached to the frame 101, such that the mounting structures 105, 107, 109 are vertically adjustable 214.

In a further related embodiment, as shown in FIGS. 2A, 11A, and 11B, the frame 101 can include at least one vertical column 205, wherein each corresponding mounting structure 105, 107, 109 in the plurality of mounting structures 105, 107, 109 can be slidably connected to the at least one vertical column 205 with at least one slidable assembly 206, which comprises:

a) a connection bracket 1106, which can be connected to the corresponding mounting structure 105, 107, 109, such that the connection bracket 1106 can be slidably connected to the at least one vertical column 205.

In a yet further related embodiment, the frame 101 can include four vertical columns 205 positioned in four side corners of the frame 101; wherein the at least one slidable assembly 206 can include four slidable assemblies, connected to four corresponding corners of the corresponding mounting structure 105, 107, 109, such that the corresponding mounting structure 105, 107, 109 can be slidably connected to the frame 101 between the four vertical columns.

In another yet further related embodiment, as shown in FIGS. 2B, 11A, 11B, and 11C, the at least one vertical column 205 can be configured as a vertical rail, which can include an elongated interior 1130;

wherein the at least one slidable assembly 206 can further include:

a) a slidable member 1120, which can be slidably 1122 inserted into the elongated interior 1130 of the vertical rail 205, such that the slidable member 1120 is slidably 1122 connected to the vertical rail 205, such that the slidable member 1120 can be connected to the connection bracket 1106; and b) a screw 1112, which can be inserted through the connection bracket 1106 and screwed into the slidable member 1120;

such that when the screw 1112 is tightened, the screw 1112 can penetrate the slidable member 1120 and touch an inner surface of the vertical rail 205, to securely hold the slidable assembly 206 against the vertical rail 205 and secure the corresponding mounting structure 105, 107, 109 at a selected vertical position; and such that when the screw 1112 is loosened, the slidable member 1120 can be slidable to permit vertical adjustment of the corresponding mounting structure 105, 107, 109.

In a related embodiment, as shown in FIGS. 2A and 7, the apparatus 100 can further include:

a) a computing device mount 270, which can be connected to the frame 101;

wherein the computing device mount 270 can be configured to permit detachable mounting of a computing device 710.

In a further related embodiment, as shown in FIGS. 2A, 12A, and 12B, the frame 101 can include at least one horizontal column 1210, wherein the computing device mount 270 can be slidably 216 connected to the at least one horizontal column 1210 with at least one horizontal slidable assembly 1270, which can include:

a) a connection bracket 1272, which can be connected to the computing device mount 270, such that the connection bracket 1272 can be slidably connected to the at least one horizontal column 1210.

In a yet further related embodiment, as shown in FIGS. 2A, 12A, and 12B, the at least one horizontal column 1210 can be configured as a horizontal rail, which can include an elongated interior 1230;

wherein the at least one horizontal slidable assembly 1270 can further include:

a) at least one slidable member 1220, which can be slidably inserted into the elongated interior 1230 of the horizontal rail 1210, such that the slidable member 1220 can be connected to the connection bracket 1272; and b) a screw 1274, which can be inserted through the connection bracket 1272 and screwed into the slidable member 1220;

such that when the screw 1274 is tightened, the screw 1274 can penetrate the slidable member 1220 and touch an inner surface of the horizontal rail 1210, to securely hold the at least one horizontal slidable assembly 1270 against the horizontal rail 1210 and secure the computing device mount 270 at a selected horizontal position; and such that when the screw 1274 is loosened, the slidable member 1220 can be slidable to permit horizontal adjustment of the computing device mount 270.

Figure 13:
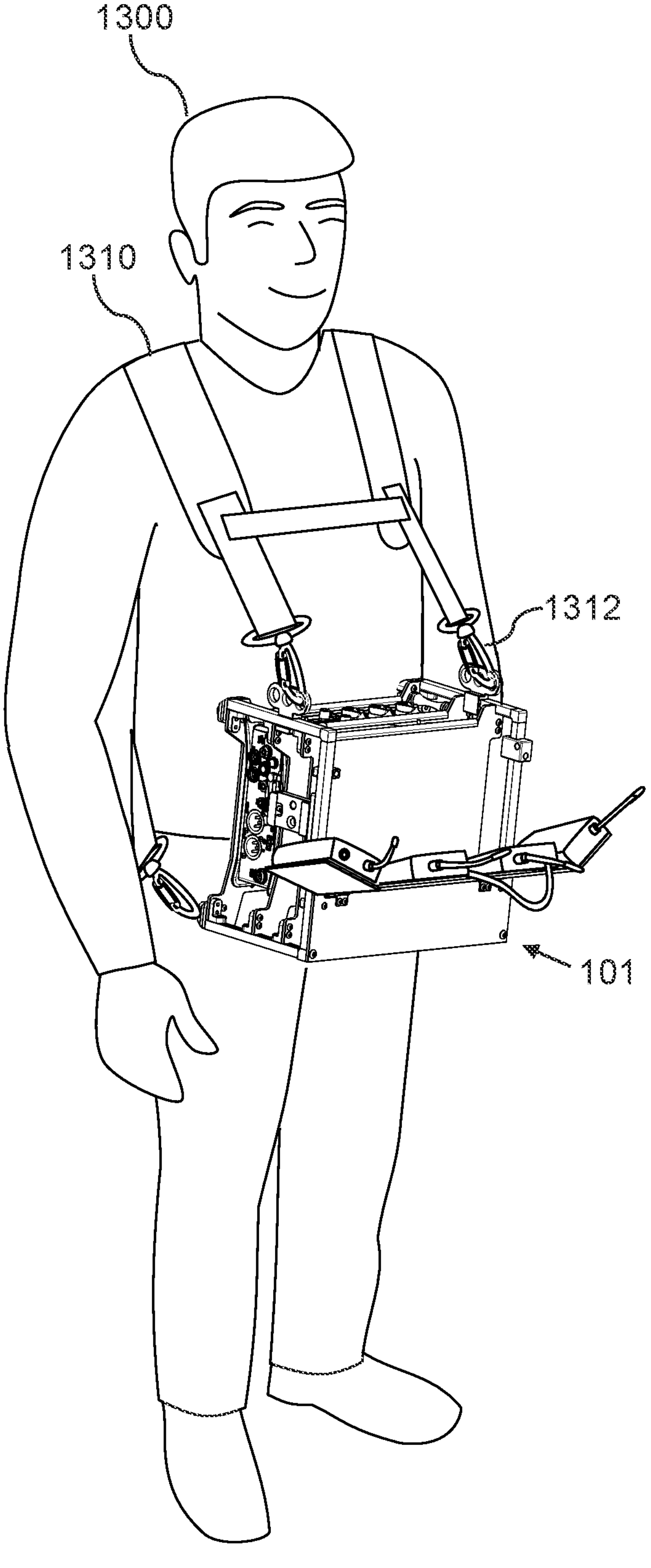
FIG. 13 illustrates a front perspective view of a user wearing a shoulder harness and frame, according to some embodiments.

In a related embodiment, as shown in FIG. 13, the apparatus 100 can further include a shoulder harness 1310, which can releasably engage with the frame 101, such that the frame 101 can be wearable and transportable by a user 1300.

Figure 14A:
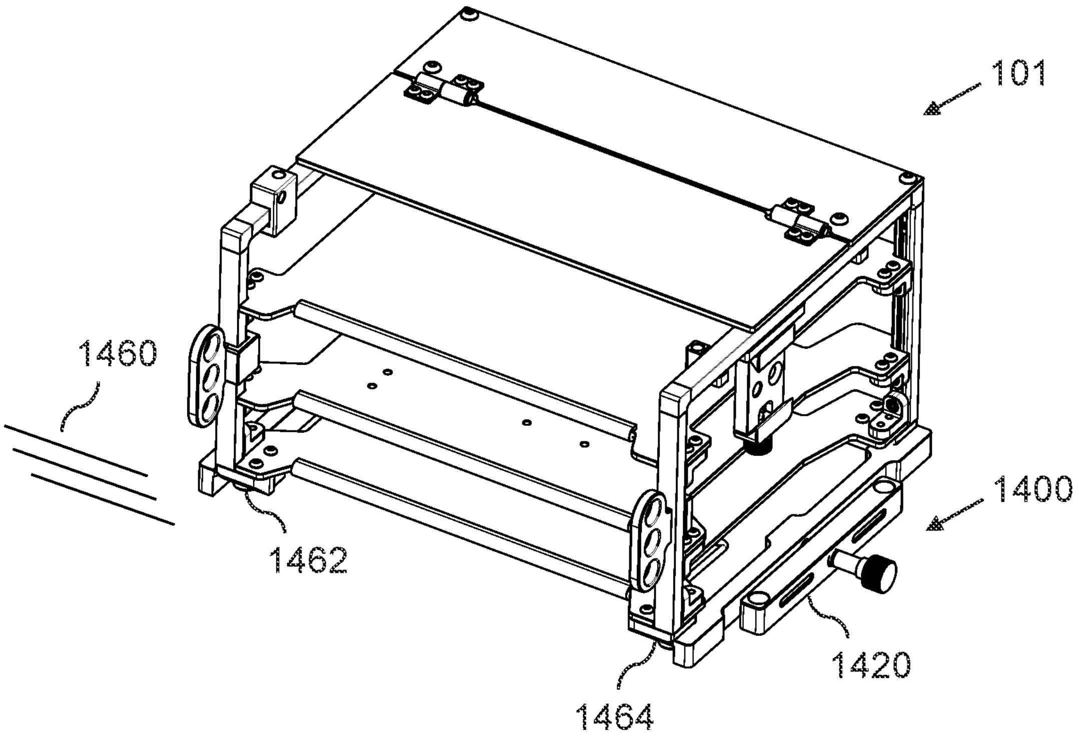
FIG. 14A illustrates a right perspective view of a frame and docking bracket mounted on a flat surface, according to some embodiments.
Figure 14B:
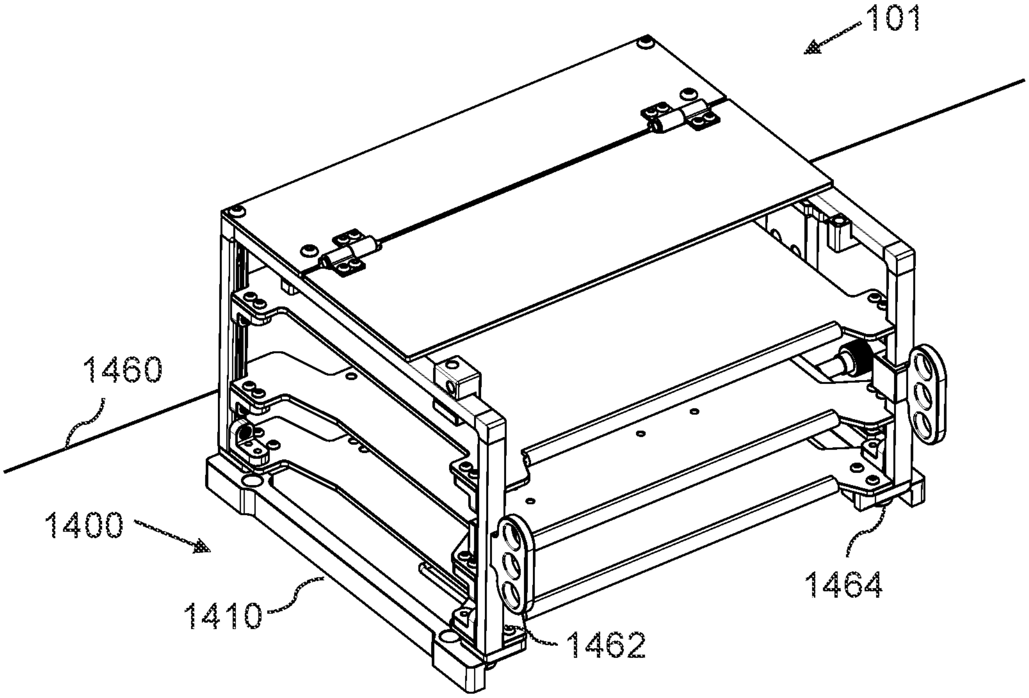
FIG. 14B illustrates a left perspective view of a frame and docking bracket mounted on a flat surface, according to some embodiments.
Figure 15A:
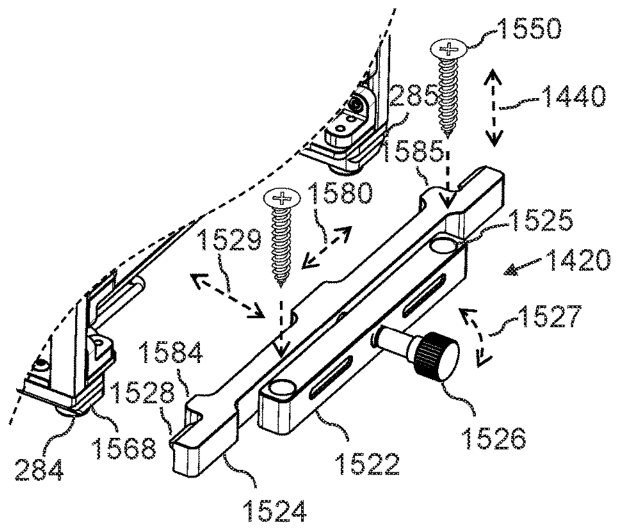
FIG. 15A illustrates a section view of the insertion of a moving jaw assembly into the frame, according to some embodiments.
Figure 15B:
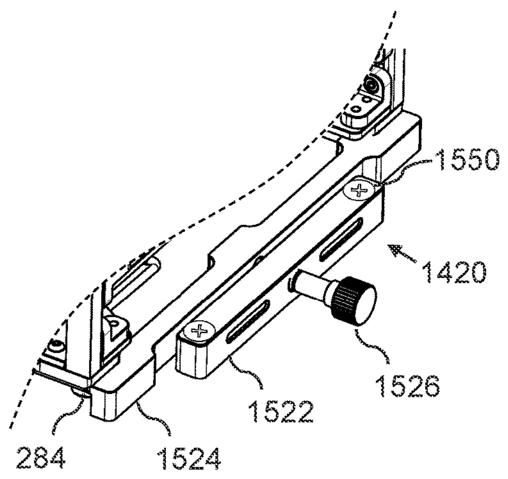
FIG. 15B illustrates a section view an inserted moving jaw assembly, according to some embodiments.
Figure 16A:
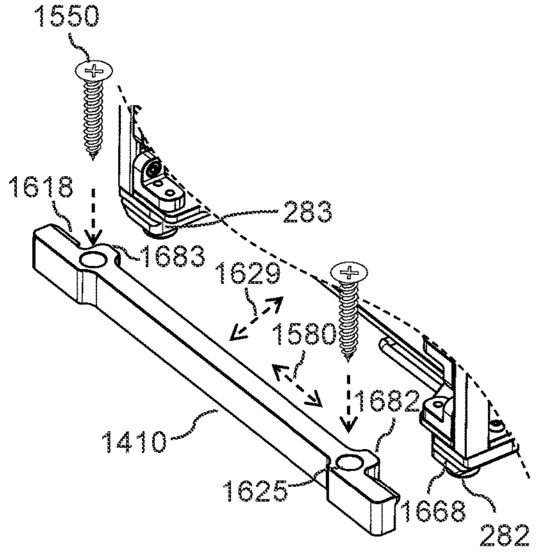
FIG. 16A illustrates a section view of the insertion of a stationary jaw into the frame, according to some embodiments.
Figure 16B:
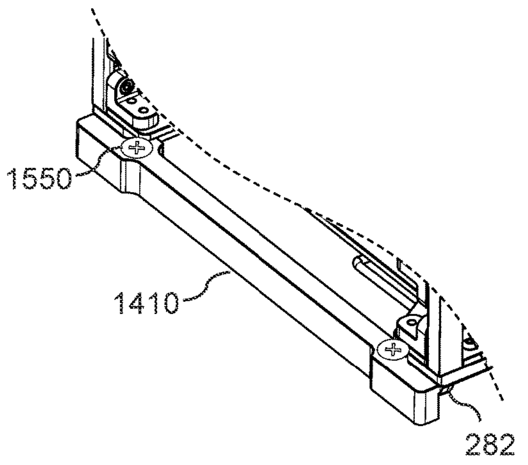
FIG. 16B illustrates a section view an inserted stationary jaw, according to some embodiments.

In another related embodiment, as shown in FIGS. 14A and 14B, the apparatus 100 can further include:

a) a docking bracket 1400, which can be connected to a mounting surface 1460;

such that the docking bracket 1400 can be configured to detachably mount the frame 101 to the mounting surface 1460.

In a further related embodiment, as shown in FIGS. 15A, 15B, 16A and 16B, the docking bracket 1400 can include:

a) a first stationary bracket member 1410, which can be configured to detachably engage with a first side 1462 of the frame 101, wherein the first stationary bracket member 1410 can be configured to be connected to the mounting surface 1460, such that the first stationary bracket member 1410 can be firmly mounted on the mounting surface 1460; and b) a moveable bracket assembly 1420, which can be configured to detachably engage with a second side 1464 of the frame 101, wherein the moveable bracket assembly 1420 can include:

i. a second stationary bracket member 1522, which can be configured to be detachably connected to the mounting surface 1460;

ii. a moveable bracket member 1524; and iii. a rotatable knob 1526, which can connect the second stationary bracket member 1522 and the moveable bracket member 1524, such that the rotatable knob 1526 can be configured to move the moveable bracket member 1524 horizontally laterally 1529 when the rotatable knob 1526 is turned;

such that the frame 101 is positionable between the first stationary bracket member 1410 and the moveable bracket member 1524;

such that the frame 101 is detachably locked in place between the first stationary bracket member 1410 and the moveable bracket member 1524, when the rotatable knob 1526 is turned to move the moveable bracket member 1524 laterally inward, toward the frame 101.

Figure 17A:
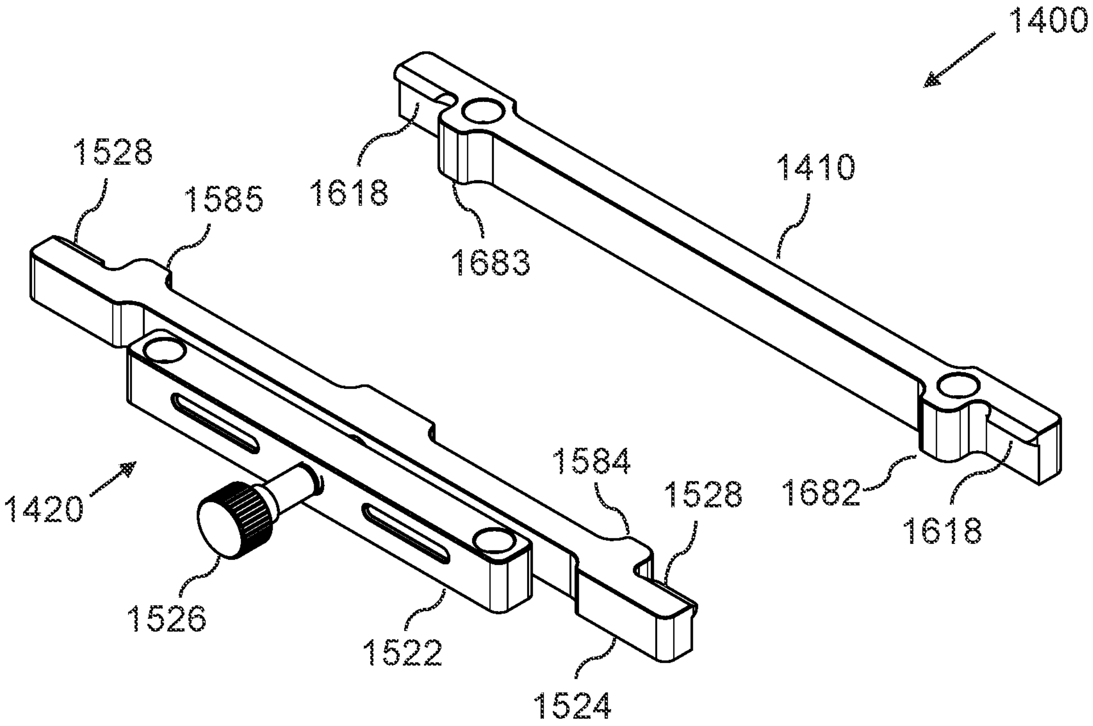
FIG. 17A illustrates a perspective view of a docking bracket, according to some embodiments.
Figure 17B:
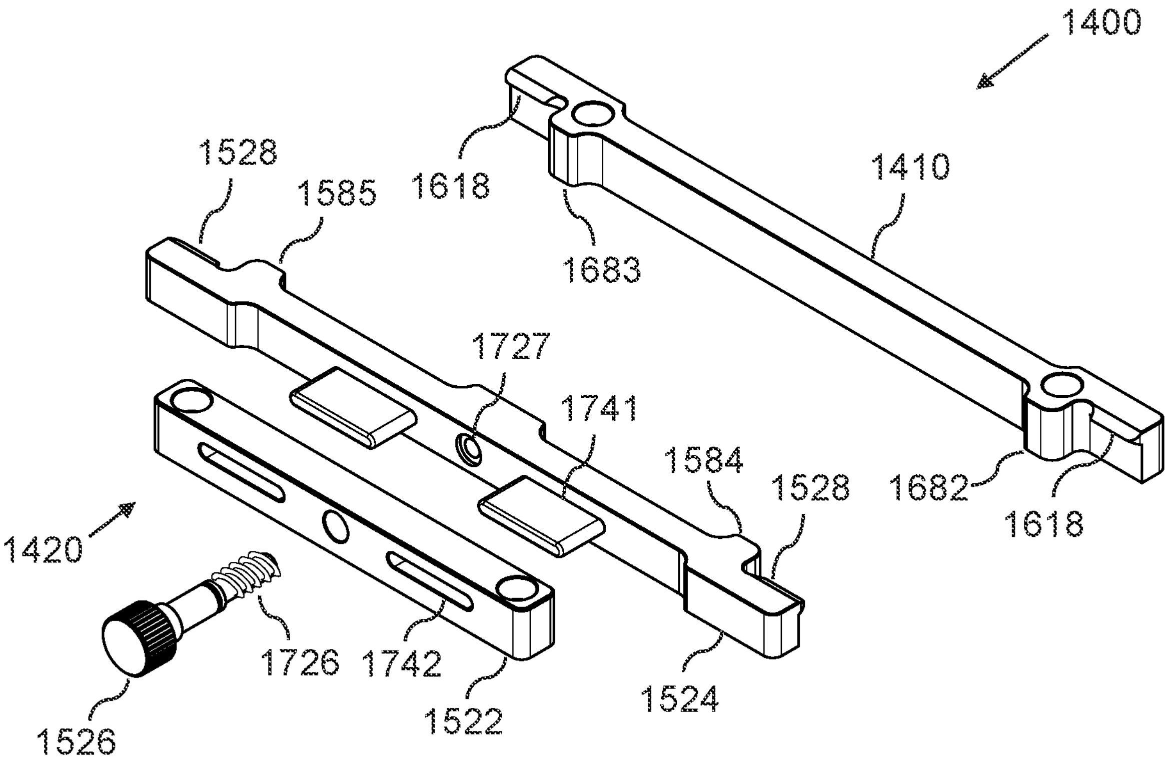
FIG. 17B illustrates an exploded view of a docking bracket, according to some embodiments.

In another related embodiment, as shown in FIG. 17B, the rotatable knob 1526 can include a threaded end portion 1726, wherein the moveable bracket member 1524 can include a threaded aperture 1727, such that the rotatable knob 1526 can be configured to be inserted through an aperture of the second stationary bracket member 1522 and into the threaded aperture 1727 of the moveable bracket member 1524, such that the threaded end portion 1726 of the rotatable knob 1526 can be configured to move the moveable bracket 1524 horizontally laterally 1529, when the rotatable knob 1526 is turned.

In a related embodiment, as shown in FIGS. 15A, 15B, 16A and 16B, the first stationary bracket member 1410 can include:

a) a plurality of first screw apertures 1625, such that a plurality of mounting screws 1550 can be insertable through the plurality of first screw apertures 1625, such that the plurality of mounting screws 1550 can screw into the mounting surface 1460, such that the plurality of mounting screws 1550 can mount the first stationary bracket member 1410 to the mounting surface 1460; and wherein the second stationary bracket member 1522 can include:

b) a plurality of second screw apertures 1525, such that the plurality of mounting screws 1550 can be insertable through the plurality of second screw apertures 1525, such that the plurality of mounting screws 1550 can screw into the mounting surface 1460, such that the plurality of mounting screws 1550 can mount the second stationary bracket member 1522 to the mounting surface 1460.

In another further related embodiment, as shown in FIGS. 15A, 15B, 16A and 16B, the first stationary bracket member 1410 can include:

a) at least one first side horizontal protrusion 1618, wherein an outer end of the first side 1462 of the frame 101 can include at least one first side horizontal notch 1668, such that the at least one first side horizontal notch 1668 can be configured to receive the at least one first side horizontal protrusion 1618; and wherein the moveable bracket member 1524 can include:

b) at least one second side horizontal protrusion 1528, wherein an outer end of the second side 1464 of the frame 101 can include at least one second side horizontal notch 1568, such that the at least one second side horizontal notch 1568 can be configured to receive the at least one second side horizontal protrusion 1528;

whereby the first stationary bracket member 1410 and the moveable bracket assembly 1420 can be mounted to the mounting surface 1460 at a slightly wider distance than a width of the frame 101, such that when the first side 1462 of the frame 101 is laterally connected 1629 to the first stationary bracket member 1410 the second side 1464 of the frame 101 can be positioned near the moveable bracket member 1524, such that the rotatable knob 1526 can be turned to move the moveable bracket member 1524 towards the second side 1464 of the frame 101, such that the at least one second protrusion 1528 can insert (i.e inserts) into the at least once second notch 1568;

wherein the at least one first side horizontal protrusion 1618, the at least one first side horizontal notch 1668, the at least one second side horizontal protrusion 1528 and the at least one second side horizontal notch 1568 can each be horizontally elongated, such that the at least one first side horizontal protrusion 1618, the at least one first side horizontal notch 1668, the at least one second side horizontal protrusion 1528 and the at least one second side horizontal notch 1568 can prevent vertical movement 1440 of the frame 101, as shown in FIG. 14A, when the frame 101 is detachably locked in place.

In yet another related embodiment, as shown in FIGS. 15A, 15B, 16A, and 16B, at least one bracket member 1410, 1524 or each of the first bracket member 1410 and the moveable bracket member 1524 can further include:

a) a corresponding side front vertical protrusion 1584, 1682; and b) a corresponding side rear vertical protrusion 1585, 1683;

wherein the frame 101 further comprises:

a corresponding side front leg structure 284, 282; and a corresponding side rear leg structure 285, 283;

such that the corresponding side front vertical protrusion 1584, 1682 is positionable adjacent to an inner side of the corresponding side front leg structure 284, 282;

such that the corresponding side rear vertical protrusion 1585, 1683 is positionable adjacent to an inner side of the corresponding side rear leg structure 285, 283; and such that horizontal depth movement 1580 of the frame 101 is prevented, when the frame 101 is detachably locked in place.

In a related embodiment, as shown in FIG. 17B, the moveable bracket member 1524 can include:

a) at least one guiding flange 1741, which can inwardly protrude from the moveable bracket member 1524, wherein the second stationary bracket member 1522 can include at least one guiding flange apertures 1742, which can be configured to receive the at least one guiding flange 1741, such that the at least one guiding flange 1741 can slide within the at least one guiding flange aperture 1742, such that the moveable bracket member 1524 can smoothly laterally slide in relation to the second stationary bracket member 1522.

In another embodiment, the second stationary bracket member 1522 can include a threaded interior, such that the threaded end portion 1726 of the rotatable knob 1526 can be configured to screw through the second stationary bracket member 1522 and fixedly attach to the moveable bracket member 1524, such that a lateral motion of the rotatable knob 1526 inside the threaded interior of the second stationary bracket member 1522 can laterally move the moveable bracket 1524.

In some embodiments, the system may utilize a stationary fourth surface affixed to the frame 101.

In some embodiments, the internal frame 101 can be primarily constructed of carbon fiber and aluminum materials. This provides rigidity while maintaining light weight for portability. To facilitate component swapping or upgrading equipment the frame 101 can be extended in height by replacing the four corner standoffs and their corresponding interior threaded rods.

When in use, the nylon shell surrounds the internal rack frame 101 and acts as a typical location sound bag allowing equipment to be easily transported using the included shoulder strap or optional body harness. When removed, the system is converted to a desk console with a folding kickstand to elevate the front for enhanced viewing and operations. This also allows users full access to all equipment and connections.

In some embodiments, D-rings and other fastening points of the bag 500 or the internal frame 101 may be suspended by a shoulder strap or a body harness.

In some embodiments, the system is configured to accept an optional integral power distribution device with rechargeable battery and a wire harness that distributes power to the various devices. The battery is mounted on an attached sled/bracket with a built-in power connector that allows one handed removal and replacement from the front of the unit. Particularly, the battery can be mounted as a front-loaded slide-in battery held in place by friction. This is unique in that for all other sound bags, the battery does not have a battery sled/bracket, nor is it fastened securely and requires two hands to remove the battery from its connector.

In some embodiments, a torque hinged panel allows wireless devices with front controls to be viewed and operated at various angles. An optional pair of side wings that are attached to the hinged panel swing out and hold additional wireless equipment at an adjustable angle as well.

In some embodiments, the bag outer shell has a hook-and-loop system to secure a microphone boom pole. An exterior pocket pouch adds additional storage capacity to the travel bag 500, and can be removed and reattached by use of the hook-and-loop strips.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

Here has thus been described a multitude of embodiments of the apparatus 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. An apparatus for carrying sound production components, comprising:
- a) a frame;
- b) a plurality of mounting structures, which are connected to the frame, such that the mounting structures are vertically interspaced, such that each mounting structure of the mounting structures is configured to releasably engage with a plurality of sound production components; and
- c) a computing device mount, which is connected to the frame;

wherein the computing device mount is configured to permit detachable mounting of a computing device;

wherein the frame comprises at least one horizontal column, wherein the computing device mount is slidably connected to the at least one horizontal column with at least one slidable assembly, which comprises:
- a connection bracket, which is connected to the computing device mount, such that the connection bracket is slidably connected to the at least one horizontal column.

2. The apparatus of claim 1, further comprising:
- a bag, which is configured to receive the frame and enclose the frame with the plurality of mounting structures and the plurality of sound production components.

3. The apparatus of claim 2, wherein the bag further comprises a bag body and a cover to enclose the frame and the plurality of sound production components within the bag body.

4. The apparatus of claim 3, wherein the cover is at least partially constructed of a transparent material to permit a user to view the plurality of sound production components within the bag.

5. The apparatus of claim 3, wherein the bag further comprises a plurality of compartments positioned on an exterior of the bag body.

6. The apparatus of claim 2, further comprising:
- a) a handle; and
- b) at least one handle bracket, which is connected to the frame;

wherein the handle is releasably engaged with the frame via the at least one handle bracket.

7. The apparatus of claim 6, wherein the handle is pivotably engaged with the at least one handle bracket.

8. The apparatus of claim 6, wherein the bag is configured to permit the handle to extend to an exterior of the bag, when the frame is positioned in the bag.

9. The apparatus of claim 6, wherein the handle further comprises:
- a telescoping portion, which comprises:
  - a first elongated member;
  - a second elongated member; and
  - a releasable lock;

wherein the telescoping portion is configured to be extendable, such that the first elongated member slides into the second elongated member;

such that when the releasable lock is released, the telescoping portion can be extended, to allow removal of the handle; and such that when the telescoping portion is shortened, the releasable lock is configured to lock the handle in place on the at least one handle bracket.

10. The apparatus of claim 1, wherein the frame is rigid.

11. The apparatus of claim 1, further comprising a folding surface, which is pivotably mounted to a top of the frame, such that the folding surface is configured to be upwards rotatable; such that at least one first sound production component of the plurality of sound production components is attachable to the folding surface when the folding surface is rotated upwards.

12. The apparatus of claim 11, further comprising at least one wing, which is pivotably mounted to a first side of the folding surface, such that the at least one wing is configured to be outwards pivotable when the folding surface is rotated upwards;

such that the at least one wing is configured to be arrangeable in a folded and an unfolded configuration;

such that at least one second sound production component of the plurality of sound production components is attachable to the at least one wing when the at least one wing is rotated outwards in the unfolded configuration.

13. The apparatus of claim 1, wherein each mounting structure in the plurality of mounting structures further comprises:

a mounting surface.

14. The apparatus of claim 1, wherein the plurality of sound production components comprise at least one of:

a) at least one power distribution system;
b) at least one recorder;
c) at least one audio mixer;
d) at least one audio recorder;
e) at least one battery;
f) at least one wireless radio;
g) at least one audio storage component; and
h) a plurality of cables.

15. The apparatus of claim 1, further comprising:

a support, which is pivotably connected to a bottom of the frame, wherein the support is configured to arrange the frame in a selected position when positioned on a flat surface, wherein the support is configurable in an in-use configuration and a storage configuration.

16. The apparatus of claim 15, wherein the selected position is an upward angled position of the frame when positioned on the flat surface.

17. The apparatus of claim 1, wherein each corresponding mounting structure in the plurality of mounting structures is vertically slidably attached to the frame, such that the mounting structures are vertically adjustable.

18. The apparatus of claim 17, wherein the frame comprises at least one vertical column, wherein each corresponding mounting structure in the plurality of mounting structures is slidably connected to the at least one vertical column with at least one slidable assembly, which comprises:

a connection bracket, which is connected to the corresponding mounting structure, such that the connection bracket is slidably connected to the at least one vertical column.

19. The apparatus of claim 18, wherein the frame comprises four vertical columns positioned in four side corners of the frame; wherein the at least one slidable assembly comprises four slidable assemblies, connected to four corresponding corners of the corresponding mounting structure, such that the corresponding mounting structure is slidably connected to the frame between the four vertical columns.

20. The apparatus of claim 18, wherein the at least one vertical column is configured as a vertical rail, which comprises an elongated interior;

wherein the at least one slidable assembly further comprises:

a) a slidable member, which is slidably inserted into the elongated interior of the vertical rail, such that the slidable member is connected to the connection bracket; and
b) a screw, which is inserted through the connection bracket and screwed into the slidable member;

such that when the screw is tightened, the screw penetrates the slidable member and touches an inner surface of the vertical rail, to securely hold the slidable assembly against the vertical rail and secure the corresponding mounting structure at a selected vertical position; and such that when the screw is loosened, the slidable member is slidable, to permit vertical adjustment of the corresponding mounting structure.

21. The apparatus of claim 1, wherein the at least one horizontal column is configured as a horizontal rail with an elongated interior;

wherein the at least one slidable assembly further comprises:

a) at least one slidable member, which is slidably inserted into the elongated interior of the horizontal rail, such that the slidable member is connected to the connection bracket; and
b) a screw, which is inserted through the connection bracket and screwed into the slidable member;

such that when the screw is tightened, the screw penetrates the slidable member and touches an inner surface of the horizontal rail, to securely hold the at least one slidable assembly against the horizontal rail and secure the computing device mount at a selected horizontal position; and such that when the screw is loosened, the slidable member is slidable, to permit horizontal adjustment of the computing device mount.

22. The apparatus of claim 1, further comprising a shoulder harness, which is releasably engaged with the frame, such that the frame is wearable and transportable by a user.

23. The apparatus of claim 1, further comprising:

a docking bracket assembly, which is connected to a mounting surface, wherein the docking bracket assembly comprises:

a first stationary bracket member, which is configured to engage with a first side of the frame, wherein the first stationary bracket member is connected to the mounting surface; and a moveable bracket assembly, which is configured to engage with a second side of the frame, wherein the moveable bracket assembly comprises:

a second stationary bracket member, which is connected to the mounting surface;

a moveable bracket member; and a rotatable knob, which connects the second stationary bracket member and the moveable bracket member, such that the rotatable knob is configured to move the moveable bracket member laterally when the rotatable knob is turned;

such that the frame is positionable between the first stationary bracket member and the moveable bracket member;

such that the frame is detachably locked in place between the first stationary bracket member and the moveable bracket member, when the rotatable knob is turned to move the moveable bracket member laterally inward, toward the frame;

such that the docking bracket assembly is configured to detachably mount the frame to the mounting surface.

24. The apparatus of claim 23, wherein the rotatable knob comprises a threaded end portion, wherein the moveable bracket member comprises a threaded aperture, such that the rotatable knob is configured to insert through an aperture of the second stationary bracket member and into the threaded aperture of the moveable bracket member, such that the threaded end portion of the rotatable knob is configured to move the moveable bracket member laterally, when the rotatable knob is turned.

25. The apparatus of claim 23, wherein the first stationary bracket member comprises:

at least one first side horizontal protrusion, wherein an outer end of the first side of the frame comprises at least one first side horizontal notch, such that the at least one first side horizontal notch is configured to receive the at least one first side horizontal protrusion; and wherein the moveable bracket member comprises:

at least one second side horizontal protrusion, wherein an outer end of the second side of the frame comprises at least one second side horizontal notch, such that the at least one second side horizontal notch is configured to receive the at least one second side horizontal protrusion;

wherein the at least one first side horizontal protrusion, the at least one first side horizontal notch, the at least one second side horizontal protrusion and the at least one second side horizontal notch are each horizontally elongated, such that the at least one first side horizontal protrusion, the at least one first side horizontal notch, the at least one second side horizontal protrusion and the at least one second side horizontal notch prevent vertical movement of the frame, when the frame is detachably locked in place.

26. The apparatus of claim 25, wherein at least one bracket member of the first stationary bracket member and the moveable bracket member further comprises:

a corresponding side front vertical protrusion; and a corresponding side rear vertical protrusion;

wherein the frame further comprises:

a corresponding side front leg structure; and a corresponding side rear leg structure;

such that the corresponding side front vertical protrusion is positionable adjacent to an inner side of the corresponding side front leg structure;

such that the corresponding side rear vertical protrusion is positionable adjacent to an inner side of the corresponding side rear leg structure; and such that horizontal depth movement of the frame is prevented, when the frame is detachably locked in place.

27. An apparatus for carrying sound production components, comprising:

a) a frame;

b) a plurality of mounting structures, which are connected to the frame, such that the mounting structures are vertically interspaced, such that each mounting structure of the mounting structures is configured to releasably engage with a plurality of sound production components;

c) a bag, which is configured to receive the frame and enclose the frame with the plurality of mounting structures and the plurality of sound production components;

d) a handle, wherein the handle further comprises:

a telescoping portion, which comprises:

a first elongated member;

a second elongated member; and a releasable lock; and e) at least one handle bracket, which is connected to the frame;

wherein the handle is releasably engaged with the frame via the at least one handle bracket;

wherein the telescoping portion is configured to be extendable, such that the first elongated member slides into the second elongated member;

such that when the releasable lock is released, the telescoping portion can be extended, to allow removal of the handle; and such that when the telescoping portion is shortened, the releasable lock is configured to lock the handle in place on the at least one handle bracket.

28. An apparatus for carrying sound production components, comprising:

a) a frame;

b) a plurality of mounting structures, which are connected to the frame, such that the mounting structures are vertically interspaced, such that each mounting structure of the mounting structures is configured to releasably engage with a plurality of sound production components; and c) a docking bracket assembly, which is connected to a mounting surface, wherein the docking bracket assembly comprises:

a first stationary bracket member, which is configured to engage with a first side of the frame, wherein the first stationary bracket member is connected to the mounting surface; and a moveable bracket assembly, which is configured to engage with a second side of the frame, wherein the moveable bracket assembly comprises:

a second stationary bracket member, which is connected to the mounting surface;

a moveable bracket member; and a rotatable knob, which connects the second stationary bracket member and the moveable bracket member, such that the rotatable knob is configured to move the moveable bracket member laterally when the rotatable knob is turned;

such that the frame is positionable between the first stationary bracket member and the moveable bracket member;

such that the frame is detachably locked in place between the first stationary bracket member and the moveable bracket member, when the rotatable knob is turned to move the moveable bracket member laterally inward, toward the frame;

such that the docking bracket assembly is configured to detachably mount the frame to the mounting surface.

* * * * *